(12) United States Patent
Francis et al.

(10) Patent No.: US 7,779,359 B2
(45) Date of Patent: Aug. 17, 2010

(54) MULTIFUNCTION DISPLAY DESIGN TOOL

(75) Inventors: Gregory S. Francis, West Lafayette, IN (US); Clarence E. Rash, Fort Rucker, AL (US); Matthew J. Reardon, Birmingham, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1430 days.

(21) Appl. No.: 09/910,669

(22) Filed: Jul. 20, 2001

(65) Prior Publication Data

US 2002/0036656 A1 Mar. 28, 2002

Related U.S. Application Data

(60) Provisional application No. 60/223,867, filed on Aug. 8, 2000.

(51) Int. Cl.
*G06F 3/00* (2006.01)
*G06F 3/048* (2006.01)
*G06F 9/44* (2006.01)

(52) U.S. Cl. .................. 715/762; 715/763; 717/105

(58) Field of Classification Search ............. 345/760, 345/762, 763; 717/106, 107, 109, 105, 104; 705/410, 411, 414; 715/762, 760, 763
See application file for complete search history.

(56) References Cited

U.S. PATENT DOCUMENTS

| | | | | |
|---|---|---|---|---|
| 5,353,401 A | * | 10/1994 | Iizawa et al. | 345/763 |
| 5,642,490 A | * | 6/1997 | Morgan et al. | 345/762 |
| 5,835,693 A | * | 11/1998 | Lynch et al. | 345/473 |
| 5,845,299 A | * | 12/1998 | Arora et al. | 715/513 |
| 5,969,717 A | * | 10/1999 | Ikemoto | 345/762 |
| 5,973,686 A | * | 10/1999 | Shimogori | 345/746 |
| 6,002,395 A | * | 12/1999 | Wagner et al. | 345/763 |
| 6,292,185 B1 | * | 9/2001 | Ko et al. | 345/763 |
| 6,330,007 B1 | * | 12/2001 | Isreal et al. | 345/762 |
| 2001/0050752 A1 | * | 12/2001 | Shirayanagi | 351/177 |
| 2005/0182709 A1 | * | 8/2005 | Belcsak et al. | 705/38 |

OTHER PUBLICATIONS

Francis, Gregory et al., Aircraft Multifunction Display and Control Systems; A New Qantitative Human Factors Design Method for Organizing Functions and Display Contents, Apr. 1997, USAARL Report No. 97-18, pp. 1-40.

(Continued)

*Primary Examiner*—Ting Lee
(74) *Attorney, Agent, or Firm*—Elizabeth Arwine

(57) ABSTRACT

A method that includes but is not limited to accepting user input specifying a geometrical arrangement of two or more buttons on one or more displayed pages; accepting user input labeling at least two of the two or more buttons on the one or more displayed pages; accepting user input defining at least one interaction between the labeled at least two buttons; accepting user input specifying at least one constraint cost for the defined at least one interaction; and assigning the labels of the at least two buttons among the two or more buttons on one or more displayed pages such that the at least one constraint cost is substantially optimized.

28 Claims, 28 Drawing Sheets

OTHER PUBLICATIONS

Francis, Gregory, "Designing Optimal Hierarchies for Information Retrieval with Multifunctional Displays", U.S. Army Aeromedical Research Laboratory, Jul. 1998, USAARL Report No. 98-33, pp. 1-60.

Francis, Greogory, "A Software Tool for the Design of Multifunction Displays", U.S. Army Aeromedical Research Laboratory, Sep. 1999, USAARL Report No. 99-20, pp. 1-65.

* cited by examiner

The MFDTool startup window, as seen in Windows 98.

```
ATM & Name
6 6 & xSize, ySize
%Buttons
1.5 0.5 0.1 0.25 & xSize, ySize, xPlace, yPlace
1.5 0.5 0.1 1.25 & xSize, ySize, xPlace, yPlace
1.5 0.5 0.1 2.25 & xSize, ySize, xPlace, yPlace
1.5 0.5 0.1 3.25 & xSize, ySize, xPlace, yPlace
1.5 0.5 0.1 4.25 & xSize, ySize, xPlace, yPlace
1.5 0.5 4.4 0.25 & xSize, ySize, xPlace, yPlace
1.5 0.5 4.4 1.25 & xSize, ySize, xPlace, yPlace
1.5 0.5 4.4 2.25 & xSize, ySize, xPlace, yPlace
1.5 0.5 4.4 3.25 & xSize, ySize, xPlace, yPlace
1.5 0.5 4.4 4.25 & xSize, ySize, xPlace, yPlace
&&
```

Contents of the file ATM.hdw, which defines the size of the MFD and the physical properties of the buttons for the ATM example.

*Fig. 10*

The MFD Hardware window shows the physical layout of the MFD and its buttons, as specified in the file ATM.hdw.

The MFD Hardware window after selecting the OK Password label show the labels on the selected page.

The MFD Set Frame Information window allows the designer to modify the name of the MFD and set the size of the MFD frame.

The MFD Set Button Information window allows the designer to modify button properties, delete a button, and create a new button.

The MFD Hierarchy window as it appears after opening the file ATM.hdw.

The MFD Hierarchy window as it appears after selecting the page name OK Password.

The MFD Page list window as it appears after opening the file ATM.hdw.

The MFD Page list window as it appears after selecting the page name OK Password.

The MFD Page list window as it appears after selecting the page Cancel.

The MFD Set Interactions window as it appears after selecting the Initial interactions.

| MFD Set Interactions: ATM | | | | |
|---|---|---|---|---|
| Select interaction | | | | Name |
| Initial interaction | | | | |
| | | | | Initial interaction |
| Delete interaction | | Duplicate interaction | | |
| New interaction | | Save interaction | | Set constraints |
| Interface coefficients | Load pre-defined coefficients | Euclidian distance | | |
| From -- To | Left top | Left 2 | Left 3 | Left 4 |
| Left top | 0.0 | 1.0 | 2.0 | 3.0 |
| Left 2 | 1.0 | 0.0 | 1.0 | 2.0 |
| Left 3 | 2.0 | 1.0 | 0.0 | 1.0 |
| Left 4 | 3.0 | 2.0 | 1.0 | 0.0 |
| Left bottom | 4.0 | 3.0 | 2.0 | 1.0 |
| Right top | 4.3 | 4.414748 | 4.7423625 | 5.2430906 |
| Right 2 | 4.414748 | 4.3 | 4.414748 | 4.7423625 |
| Right 3 | 4.7423625 | 4.414748 | 4.3 | 4.414748 |
| Right 4 | 5.2430906 | 4.7423625 | 4.414748 | 4.3 |
| Coefficients updated. | | | | |

The MFD Set Interactions window as it appears after loading coefficients for *Euclidian distance*.

*Fig. 21*

The MFD Constraints: ATM – Initial interaction window when it first appears.

The MFDTool window as it appears after creating and saving the constraint Global.

The MFD Constraint window as it appears after creating and saving the constraint Cancel same place. The list Constrained pages shows all the pages restricted by this constraint.

The MFD Constraints window as it appears after creating and saving the constraint Cancel on bottom. The list Constrained pages shows all the pages restricted by this constraint. The list Select buttons shows the buttons that the constrained pages must be restricted to.

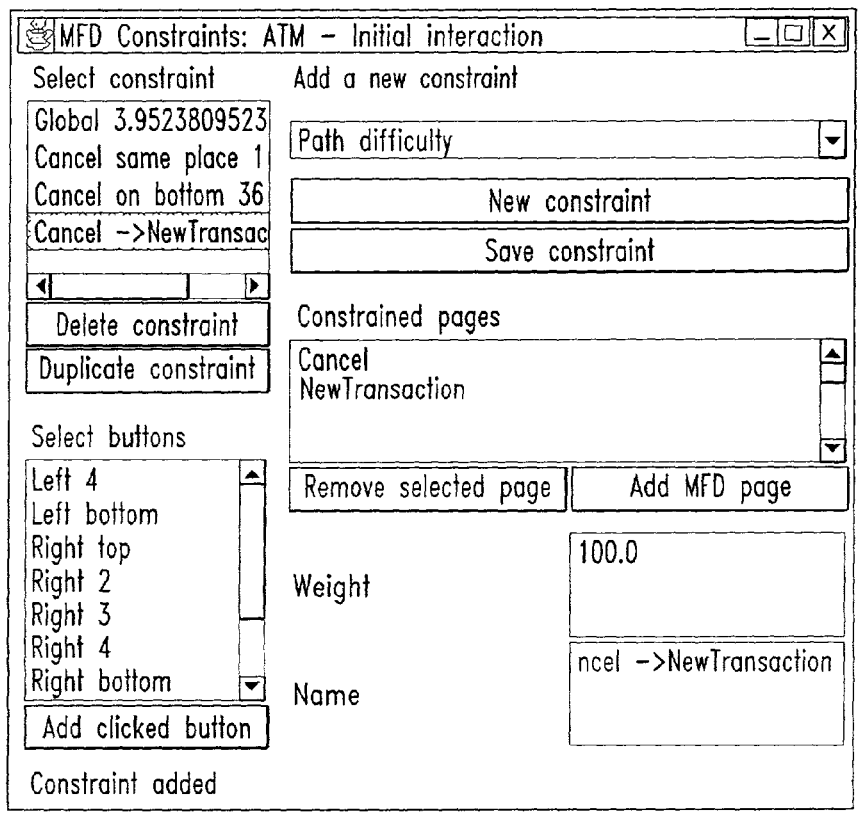

The MFD Constraints window as it appears after creating and saving the constraint Cancel -> New Transaction. The list Constrained pages shows the path of pages restricted by this constraint. In this case, the path starts at the Cancel hyperlink under Fast cash and goes to the New Transaction page under the Cancel page near the top of the hierarchy. MFDTool will assign page labels to buttons so that the sum of interaction coefficients is minimized along this path of pages.

*Fig. 26*

The MFD Constraints window as it appears after creating and saving the constraint Checking variance. The list of Constrained pages shows all the pages restricted by this constraint.

The MFD Optimization window as it appears while running an optimization.

The MFD Constraints window as it appears after the optimization. The cost for all but the Global is zero, indicating that these constraints are perfectly satisfied.

The MFD Set Optimizer window.

MULTIFUNCTION DISPLAY DESIGN TOOL

CROSS REFERENCE(S) TO RELATED APPLICATIONS

This patent application hereby incorporates by reference in its entirety pending Provisional Patent Application No. 60/223,867, filed Aug. 8, 2000, naming Gregory S. Francis, Clarence E. Rash, and Matthew J. Reardon as inventors; furthermore, this patent application also claims the benefit of the foregoing-referenced pending provisional patent application No. 60/223,867 under the auspices of 35 U.S.C. §119(e).

BACKGROUND OF THE INVENTION

1. Field of the Invention

The devices and processes described herein relate, in general, to data processing system interactions.

2. Description of the Related Art

Data processing systems are systems that manipulate, process, and store data. Personal computer systems, and their associated subsystems, constitute well-known examples of data processing systems.

Data processing systems often provide assistance to humans. Examples of such assistance are automated co-pilots which assist human pilots in flying, automated teller machines which assist humans in banking transactions, paging devices which assist humans in remotely communicating with other humans or machines, and automated medical diagnosis tools which assist human doctors in the practice of medicine.

When a data processing system is used to provide assistance to a human, the data processing system and the human often interact with each other. One way in which the data processing system and the human can interact is by use of a multifunction (or multi-purpose) display (MFD).

An MFD is generally composed of an integrated combination of input and output devices which allow the data processing system to receive information from and transmit information to a human user. Examples of MFD input devices are hardware switches or graphical user interface buttons. Examples of MFD output devices are MFD visual display devices such as a cathode ray tube (CRT) or a Liquid Crystal Display (LCD) computer screen.

Generally MFDs have their input devices integrated directly into their output devices for use of ease. Common examples of such MFDs are touch-screen displays which transmit information to a human via display and receive information from a human via human touch of virtually invisible switches of a piece with the visual display, light-pen activated displays which transmit information to a human via display and receive information from a human via the human activating virtually invisible light-sensitive switches of a piece with the visual display, or graphical user interfaces displays which transmit information to a human via display and receive information from a human via the human pointing and clicking graphical icons on the display via use a mouse.

When a human is interacting with an MFD, the human will generally enter data by activating "buttons" ("button" is a shorthand notation used herein to denote the regions on the visual display device which a human user can manipulate by means of touching a switch integrated with the display device with a finger, stimulating a switch integrated with the display device with a light pen, or clicking a graphical icon displayed in the display device via user of a mouse pointer) in response to labels presented on the buttons. The buttons serve to allow the data processing system to transmit information to and receive information from the human. The transmission of information by the data processing system is generally achieved via display of textual or iconic labels on the buttons. The reception of information by the data processing system is generally achieved by the human activating the buttons.

Typically, when a data processing system is utilized to provide assistance to a human, the human and data processing system interact through the input and output devices of the MFD in order to accomplish a defined task. One example of the foregoing is use of an automated teller machine MFD by a human to accomplish a banking transaction.

When a human engages in a banking transaction (e.g., determining an account balance and thereafter withdrawing cash from the account) with a human bank teller, the humans interact to engage in a set of operations necessary to complete the transaction. If confusion ensues during the course of the banking transaction, the human engaging in the banking transaction can interact with the human bank teller in order to resolve the confusion and complete the transaction. This is not the case when an automated teller machine MFD is utilized to accomplish a banking transaction.

When a human is interacting with an MFD to accomplish a banking transaction, the same series of operations must be performed as when the human bank teller is present. However, unlike the previous example, there is no human teller present to assist the human engaging in the banking transaction. Accordingly, great care must be taken with respect to how the MFD interacts with the human user such that the risk of confusion of the human user is minimized.

There are, in general, two broad steps associated with designing how the MFD will interact with a human to accomplish a given task (e.g., a banking transaction) such that risks of confusion to the human user are reduced. The first broad step is to clearly define the set of human-machine interactions which need to be achieved in order to accomplish the given task. This defined set of human-machine interactions is generally referred to as the "information hierarchy" associated with the given task, since, in an abstract sense, it will designate how information will be transmitted and received between the data processing system and the human user. The second broad step is to present the information hierarchy to the human user such that the risks of confusion to the human user are substantially minimized.

The information hierarchy is often presented to the human user through a series of displayed pages which present information to and receive information from the human. As used herein, the term "displayed page" refers to a totality of a screen of information presented to the human user through the visual display device. A human-detectable change in the totality of the information presented will be referred to as the presentation of new displayed page. For example, if a label on a button is changed, such change will be referred to herein as the presentation of a new displayed page. An example of a displayed page is a World Wide Web page displayed on a display device.

It is important that the presentation of the information hierarchy is such that a substantial percentage of human users will be able to transmit and receive required task-specific information through the MFD without becoming confused. In order to guard against confusion, care must be taken in how the information hierarchy is mapped to the one or more buttons on the one or more displayed pages presented to the human user. Mapping the information hierarchy to the one or more buttons on the one or more displayed pages in a fashion that decreases the likelihood of confusion is generally considered to be an extremely challenging task within the art.

It is common within the art for human MFD designers to map the information hierarchy to the one or more buttons on the one or more displayed pages on the basis of a balancing of tradeoffs between one or more design criteria identified by the human MFD designers. However, insofar as there exists within the art no substantial tools allowing for the quantification of either the design criteria or quantification of the tradeoffs between the one or more design criteria, the common methodology within the art is for human MFD designers to empirically explore several different mapping options until the whole system "feels" good to human test subjects. As a result, MFD creation largely remains an artistic endeavor, depending primarily on the experience, intuition, and hard work of the human MFD designer.

While MFD design will continue to be, in large part, an artistic endeavor, the inventors named herein (inventors) have discovered that the design skills of the human designer can be enhanced by devices and processes devised by the inventors which allow for automated assignment of button labels across one or more displayed pages in response to input quantitatively specifying design constraints and tradeoffs.

SUMMARY OF THE INVENTION

The inventors named herein have invented a method and related system which allow for automated assignment of button labels across one or more displayed pages in response to input quantitatively specifying design constraints and tradeoffs.

In one embodiment, a method includes but is not limited to accepting user input specifying a geometrical arrangement of two or more buttons on one or more displayed pages; accepting user input labeling at least two of the two or more buttons on the one or more displayed pages; accepting user input defining at least one interaction between the labeled at least two buttons; accepting user input specifying at least one constraint cost for the defined at least one interaction; and assigning the labels of the at least two buttons among the two or more buttons on one or more displayed pages such that the at least one constraint cost is substantially optimized. In addition to the foregoing, other method embodiments are described in the claims, drawings, and text forming a part of the present application.

In one or more various embodiments, related systems include but are not limited to circuitry and/or programming for effecting the foregoing-referenced method embodiments; the circuitry and/or programming can be virtually any combination of hardware, software, and/or firmware configured to effect the foregoing-referenced method embodiments depending upon the design choices of the system designer.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the devices and/or processes described herein, as defined solely by the claims, will become apparent in the non-limiting detailed description set forth herein.

BRIEF DESCRIPTION OF THE DRAWINGS

The devices and/or processes described herein may be better understood, and their numerous objects, features, and advantages made apparent to those skilled in the art by referencing the accompanying drawings.

FIG. 10 shows contents of the file ATM.hdw, which defines the size of the MFD and the physical properties of the buttons for the ATM example.

FIG. 21 shows the MFD Set Interactions window as it appears after loading coefficients for Euclidean distance.

FIG. 26 depicts the MFD Constraints window as it appears after creating and saving the constraint Cancel→New Transaction.

The use of the same reference symbols in different drawings indicates similar or identical items.

DESCRIPTION OF THE PREFERRED EMBODIMENT(S)

The following sets forth a detailed description for carrying out the devices and/or processes described herein. The description is intended to be illustrative and should not be taken to be limiting.

As noted in the description of the related art, the inventors have discovered that the design skills of the human designer can be enhanced by devices and processes devised by the inventors which allow for automated assignment of button labels across one or more displayed pages in response to input quantitatively specifying design constraints and tradeoffs. In making the foregoing-noted discovery, the inventors studied expert human MFD designers and discovered that the expert human MFD designers studied tended to rely on a balancing of a multitude of general guidelines. The inventors found that the general guidelines were in general heuristic (human-psychological) guidelines which could not, in general, be adapted to an automated approach. As a result of such research the inventors created a catalog of such heuristic guidelines, a partial listing of which appears in Section 1 of the Example Designer's Guide for a Specific Implementation of MFD Design Tool Devices and Processes Described in FIGS. 1-8, appearing below.

In examining their cataloged list of the heuristic general guidelines used by expert human MFD designers, the inventors discovered that application of the general guidelines is often problematic because such guidelines often conflict with each other. One example of such conflicts appears in Section 1 of the Example Designer's Guide for a Specific Implementation of the MFD Design Tool Devices and Processes Described in FIGS. 1-8, appearing below.

In studying the expert human MFD designers, the inventors determined that the expert human MFD designers resolved the foregoing-noted general guideline conflicts by giving one or more of the guidelines precedence. However, the inventors found that such giving of precedence was a largely unarticulated process within the confines of the minds of the expert human MFD designers.

Once the inventors had identified the foregoing-noted heuristic design guidelines utilized by the expert human MFD designers in assigning labels to MFD buttons, the inventors created devices and processes based upon an inventor-devised set of general guidelines which could be used in place of the foregoing-noted heuristic design guidelines to achieve substantially the same purpose as the foregoing-noted heuristic design guidelines. These created devices and processes are described in FIGS. 1-8, following. Thereafter, an Example Designer's Guide for a Specific Implementation of the MFD Design Tool Devices and Processes Described in FIGS. 1-8 is set forth wherein various specific implementation aspects are described.

Figure 1:
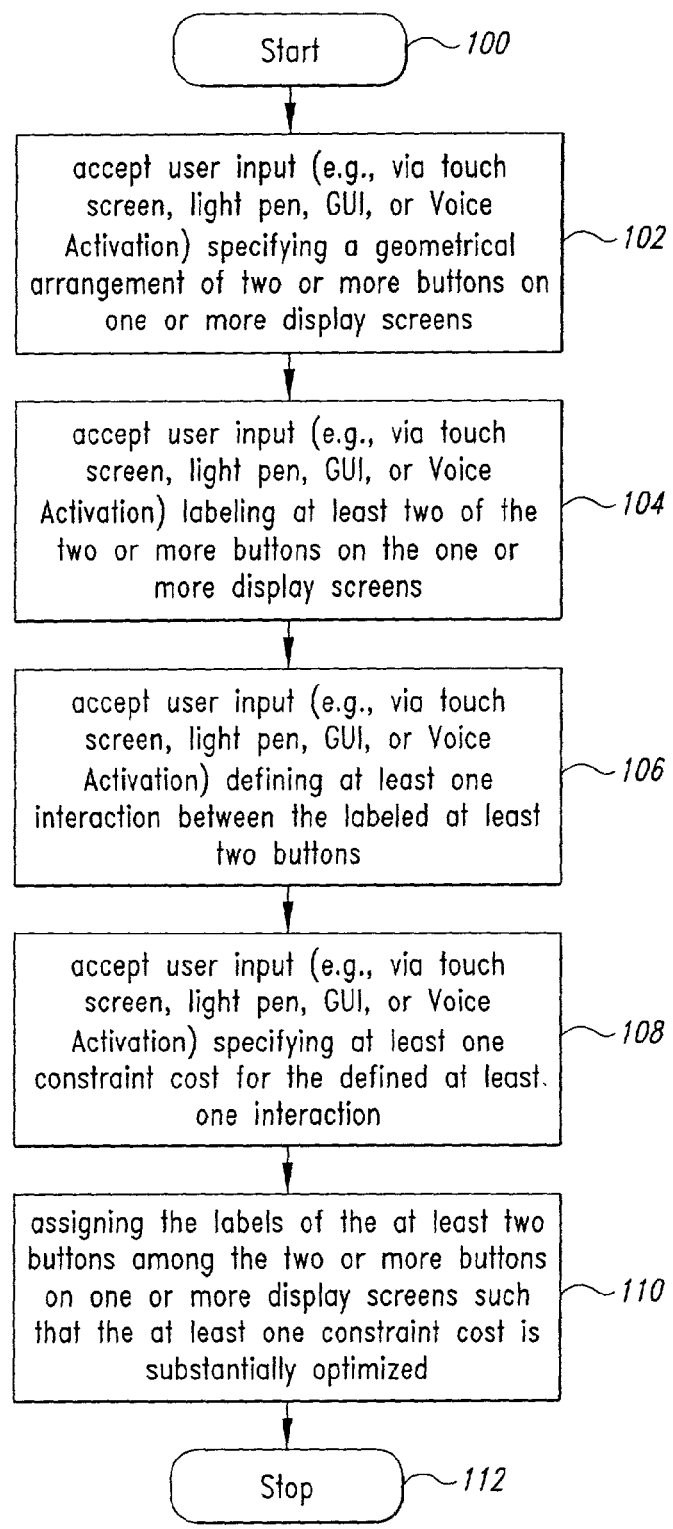
FIG. 1 shows a high-level logic flowchart depicting a process.

With reference to the figures, and with reference now to FIG. 1, shown is a high-level logic flowchart depicting a process. Method step 100 illustrates the start of the process. Method step 102 shows accepting user input (e.g., via touch screen, light pen, GUI, or Voice Activation) specifying a geometrical arrangement of two or more buttons on one or more displayed pages (e.g., specifying the positioning of two buttons on an MFD displayed page of specified size).

As noted above, the "information hierarchy," or set of operations necessary to achieve a given task, is known before labeling of MFD buttons begins. Accordingly, method step 104 depicts accepting user input (e.g., via touch screen, light pen, GUI, or Voice Activation) labeling at least two of the two or more buttons on the one or more displayed pages, referenced in method step 102, with the names of all the operations necessary to achieve the desired task (e.g., labeling a first button as "show balance" and a second button as "withdraw cash," in a banking transaction scenario).

Method step 104 depicted labeling at least two of the two or more buttons with the operations necessary to achieve a defined task at hand (e.g., a specified banking transaction). Thus, subsequent to method step 104 there exists at least one button labeled for each operation in the defined information hierarchy; however, note that method step 104 described labeling the buttons, but did not describe relating the buttons to each other in any particular order. Thus, at this point in the process, the labels are in the system, but have not been related to each other in any particular order.

Insofar as the information hierarchy is known, the sequence of operations in the set of operations is known. Accordingly, insofar as the labeling of the buttons equates to the operations in the set of operations, method step 106 illustrates accepting user input (e.g., via touch screen, light pen, GUI, or Voice Activation) defining at least one interaction between the labeled at least two buttons such that the defined interactions match the sequence of operations in the set of operations necessary to achieve the desired task; the interactions between buttons is specified based on some mathematically quantifiable variable (e.g., distance between buttons, or average time required for a human to move from one button to the next) so that such interactions can be used in calculations.

Once the interactions between buttons have been quantitatively specified, the quantified interactions between the at least two labeled buttons can be used to calculate various types of defined constraint costs drawn on the defined quantified interactions. Accordingly, method step 108 shows accepting user input (e.g., via touch screen, light pen, GUI, or Voice Activation) specifying at least one constraint cost for the defined at least one interaction (examples of various types of constraint costs are discussed below).

Once the at least one constraint cost has been specified, substantially all the labels can be reassigned across the buttons in response to substantial optimization routines processing on the specified at least one constraint cost. Accordingly, method step 110 depicts assigning (or reassigning, if it is calculated to be more optimal to move buttons between labels) the labels of the at least two buttons among the two or more buttons on one or more displayed pages such that the at least one constraint cost is substantially optimized. Method step 112 illustrates the end of the process.

Figure 2:
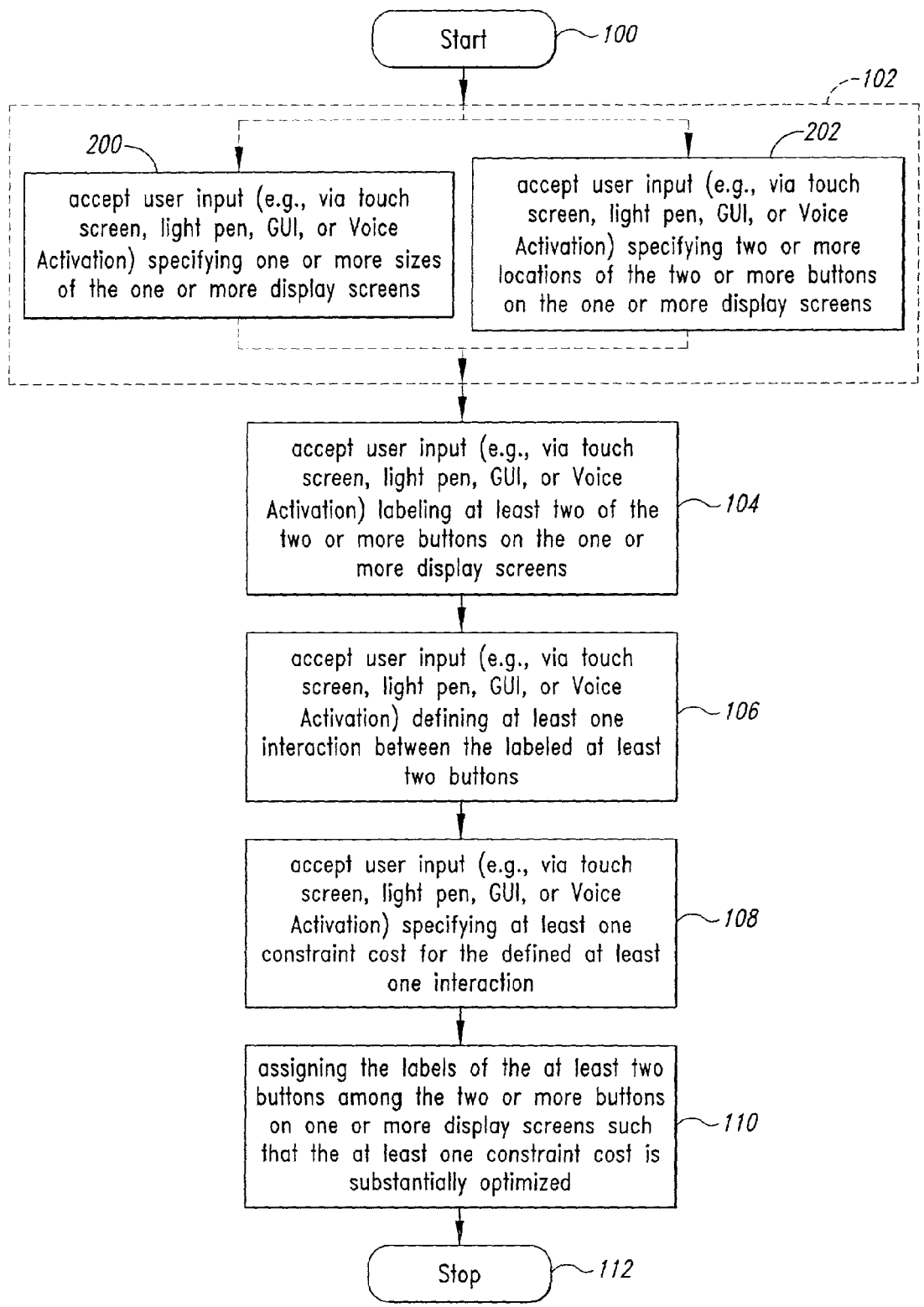
FIG. 2 depicts the high-level logic flowchart of FIG. 1 wherein two embodiments of method step 102 are illustrated.

Referring now to FIG. 2, depicted is the high-level logic flowchart of FIG. 1 wherein two embodiments of method step 102 are illustrated. Method step 200 shows accepting user input (e.g., via touch screen, light pen, GUI, or Voice Activation) specifying one or more sizes of the one or more displayed pages (e.g., specifying length and width). Alternatively, method step 202 depicts accepting user input (e.g., via touch screen, light pen, GUI, or Voice Activation) specifying two or more locations of the two or more buttons on the one or more displayed pages. Note that in yet another embodiment, method steps 200 and 202 are engaged in sequentially (i.e., first the display size is specified and thereafter the locations of buttons on various hierarchically displayed pages are specified). Examples of implementations of method steps 200 and 202 appear in at least Section 3 of the Example Designer's Guide for a Specific Implementation of the MFD Design Tool Devices and Processes Described in FIGS. 1-8, appearing below.

Figure 3:
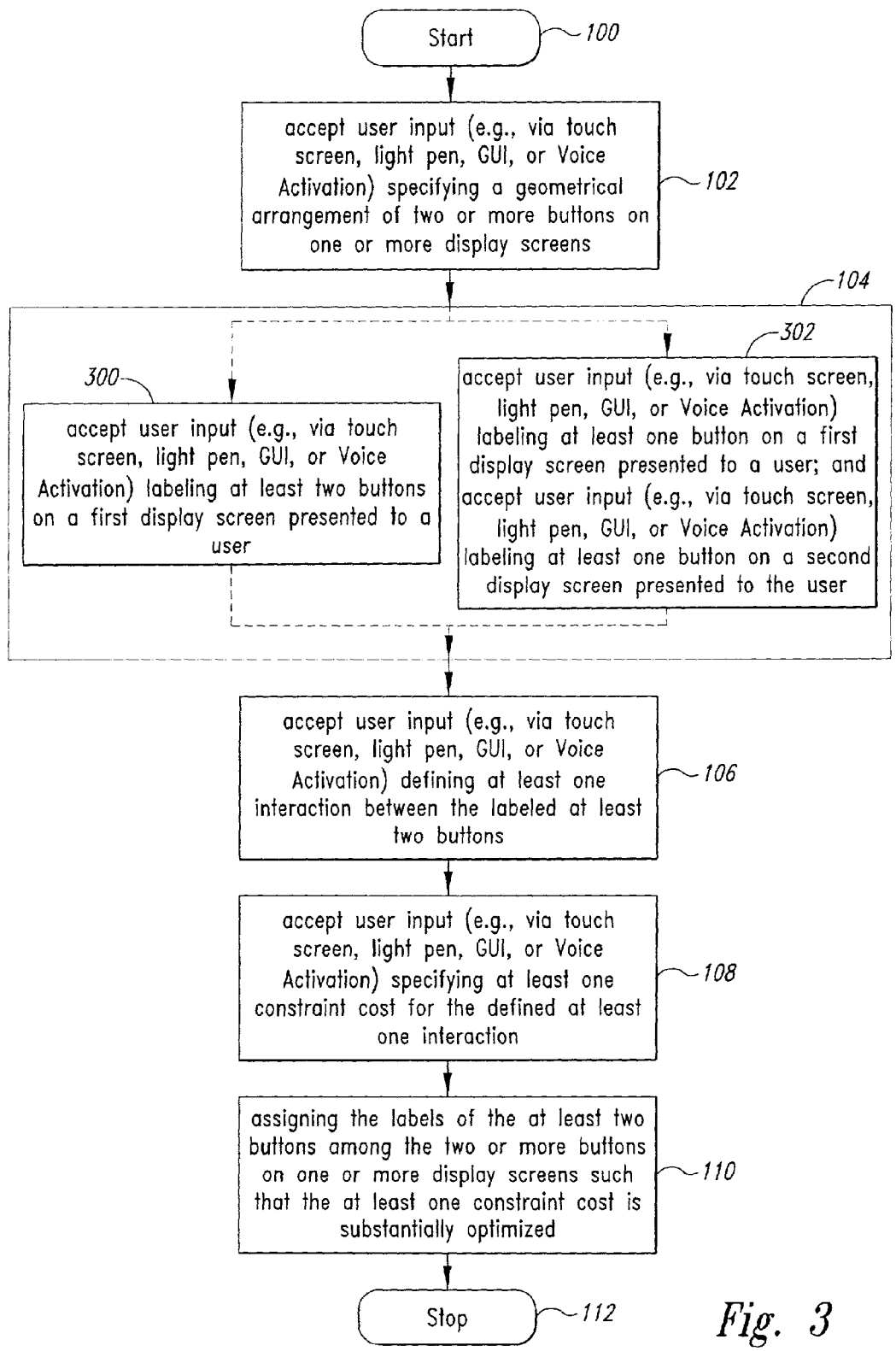
FIG. 3 illustrates the high-level logic flowchart of FIG. 1 wherein two embodiments of method step 104 are illustrated.

With reference now to FIG. 3, depicted is the high-level logic flowchart of FIG. 1 wherein two embodiments of method step 104 are illustrated. Method step 300 shows accepting user input (e.g., via touch screen, light pen, GUI, or Voice Activation) labeling at least two buttons on a first displayed page presented to a user. Alternatively, method step 302 depicts accepting user input (e.g., via touch screen, light pen, GUI, or Voice Activation) labeling at least one button on a first displayed page presented to a user, and accepting user input (e.g., via touch screen, light pen, GUI, or Voice Activation) labeling at least one button on a second displayed page presented to the user. Examples of implementations of method steps 300 and 302 appear in at least Section 4 of the Example Designer's Guide for a Specific Implementation of the MFD Design Tool Devices and Processes Described in FIGS. 1-8, appearing below.

Figure 4:
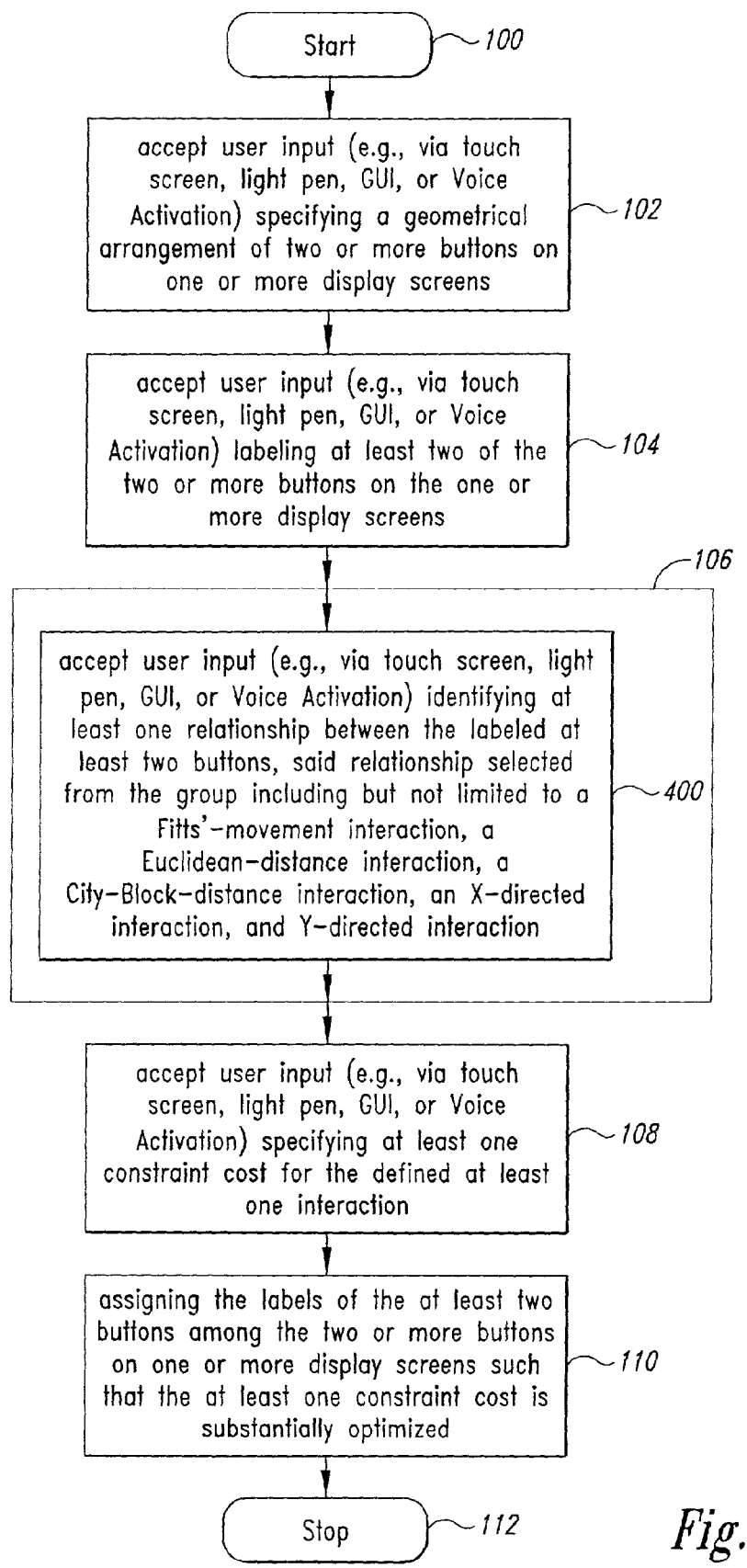
FIG. 4 shows the high-level logic flowchart of FIG. 1 wherein several embodiments of method step 106 are illustrated.

Referring now to FIG. 4, depicted is the high-level logic flowchart of FIG. 1 wherein several embodiments of method step 106 are illustrated. Method step 400 shows accepting user input (e.g., via touch screen, light pen, GUI, or Voice Activation) identifying at least one relationship between the labeled at least two buttons, the relationship selected from the group including but not limited to a Fitts'-movement interaction, a Euclidean-distance interaction, a City-Block-distance interaction, an X-directed interaction, and a Y-directed interaction. Note that in method step 400, each of the identified at least one relationship constitutes a separate embodiment of at least a part of the devices and processes described herein. Examples of implementations of method step 400 appear in at least Section 5 of the Example Designer's Guide for a Specific Implementation of the MFD Design Tool Devices and Processes Described in FIGS. 1-8, appearing below.

Figure 5:
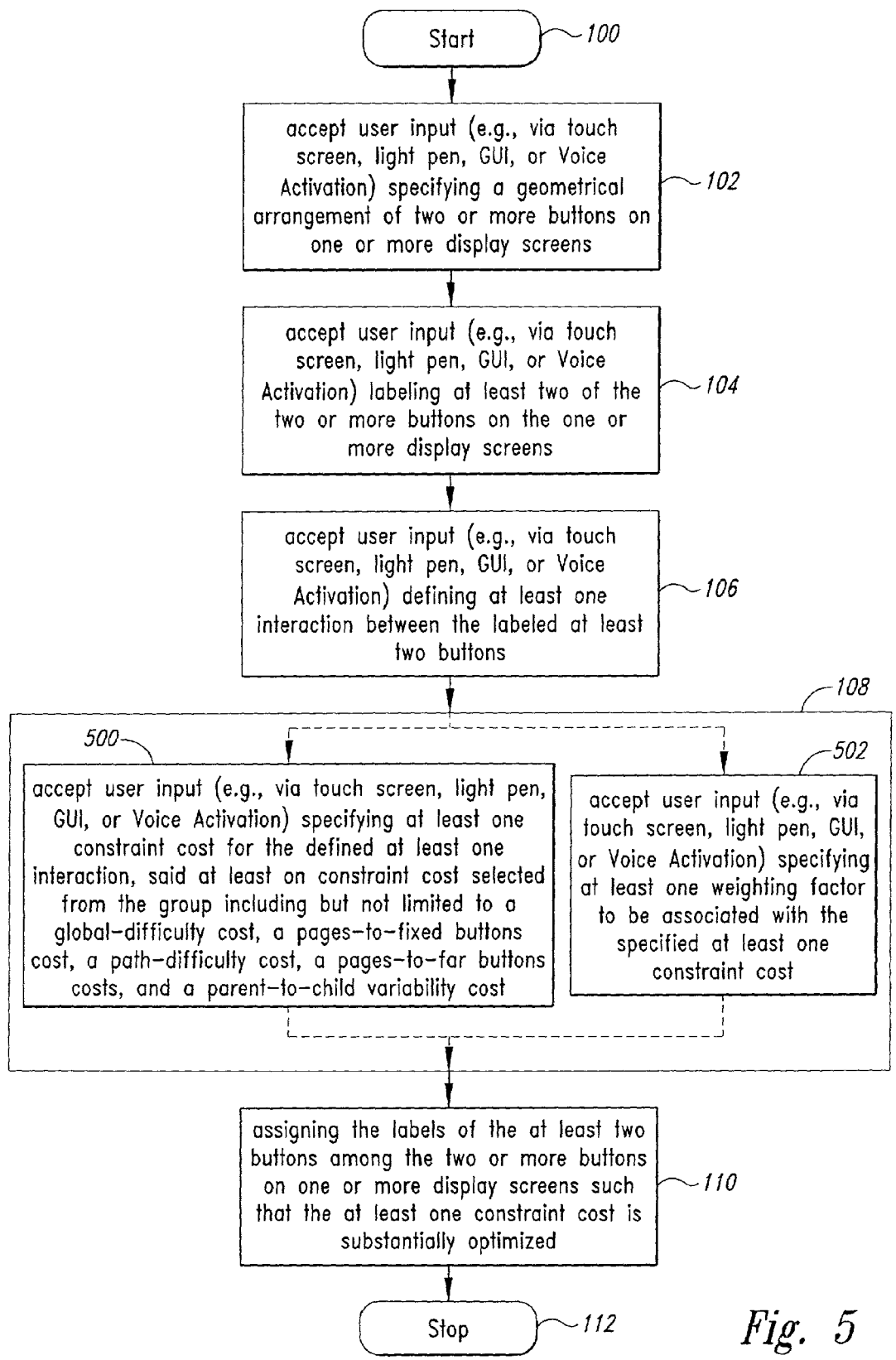
FIG. 5 depicts the high-level logic flowchart of FIG. 1 wherein several embodiments of method step 108 are illustrated.

With reference now to FIG. 5, illustrated is the high-level logic flowchart of FIG. 1 wherein several embodiments of method step 108 are illustrated. Method step 500 shows accepting user input (e.g., via touch screen, light pen, GUI, or Voice Activation) specifying at least one constraint cost for the defined at least one interaction, said at least one constraint cost selected from the group including but not limited to a global-difficulty cost, a pages-to-close-buttons cost, a pages-to-fixed buttons cost, a path-difficulty cost, a pages-to-far buttons cost, and a parent-to-child variability cost. Alternatively, method step 502 depicts accepting user input (e.g., via touch screen, light pen, GUI, or Voice Activation) specifying at least one weighting factor to be associated with the specified at least one constraint cost. Note that in yet another embodiment, method steps 500 and 502 are engaged in sequentially (i.e., first constraint costs are specified and thereafter the weightings of the various constraints are specified). Examples of implementations of method step 500 and 502 appear in at least Section 5 of the Example Designer's Guide for a Specific Implementation of the MFD Design Tool Devices and Processes Described in FIGS. 1-8, appearing below.

Figure 6:
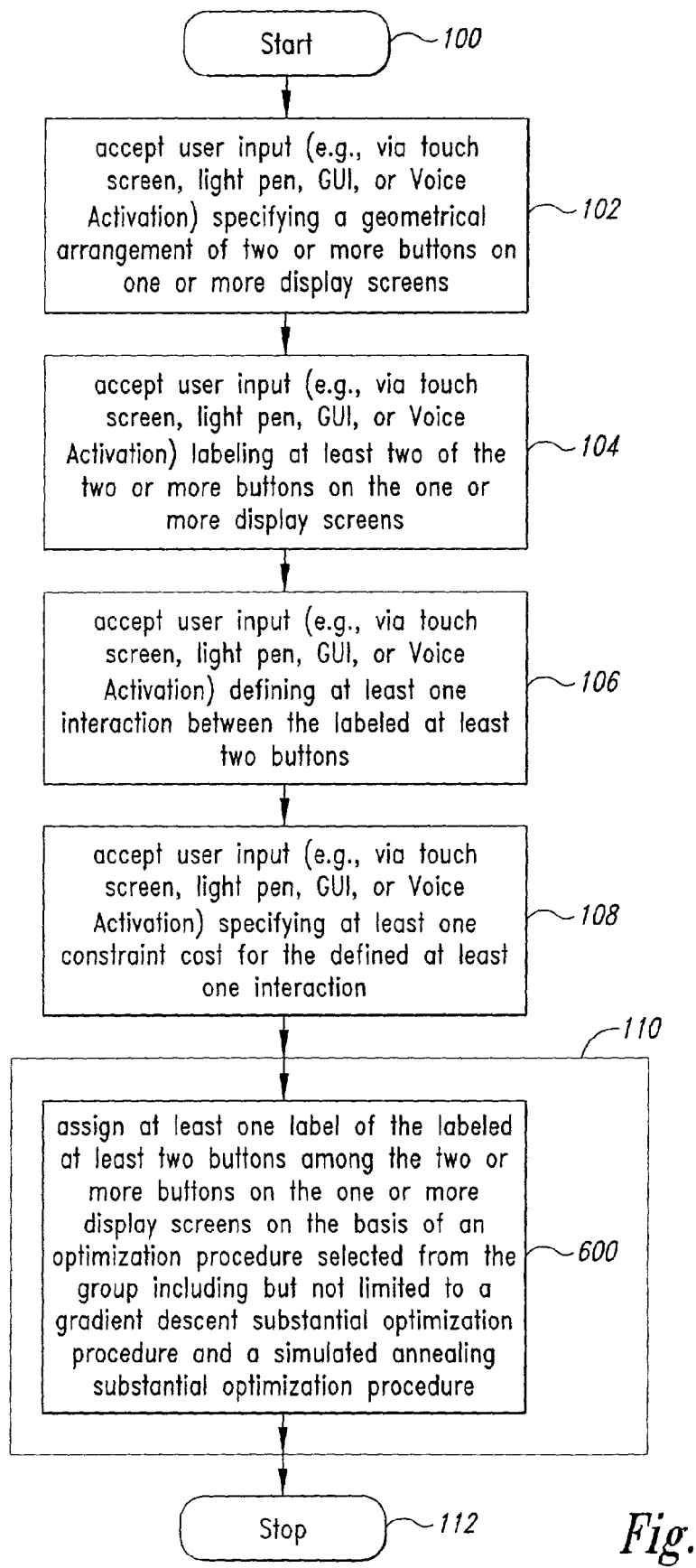
FIG. 6 illustrates the high-level logic flowchart of FIG. 1 wherein several embodiments of method step 110 are illustrated.

Referring now to FIG. 6, depicted is the high-level logic flowchart of FIG. 1 wherein several embodiments of method step 110 are illustrated. Method step 600 shows assigning at least one label of the labeled at least two buttons among the two or more buttons on the one or more displayed pages on the basis of a substantial optimization procedure selected from the group including but not limited to a gradient descent substantial optimization procedure and a simulated annealing substantial optimization procedure. Note that in method step 600, each of the identified optimization procedures constitutes a separate embodiment of at least a part of the devices and processes described herein. Examples of implementations of method step 600 appear in at least Section 6 of the Example Designer's Guide for a Specific Implementation of the MFD Design Tool Devices and Processes Described in FIGS. 1-8, appearing below.

Those having ordinary skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having ordinary skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as one or more computer programs running on one or more computers (e.g., as one or more programs running on one or more computer systems), as one or more programs running on one or more processors (e.g., as one or more programs running on one or more processors), as firmware, or as virtually any combination thereof, and that designing the circuitry and/or writing the code for the software and or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analogue communication links using TDM or IP based communication links (e.g., packet links).

In a general sense, those skilled in the art will recognize that the various embodiments described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., any and all forms of random access memory), and electrical circuitry forming a communications device (e.g., a modem, communications switch, or optical-electrical equipment).

Figure 7:
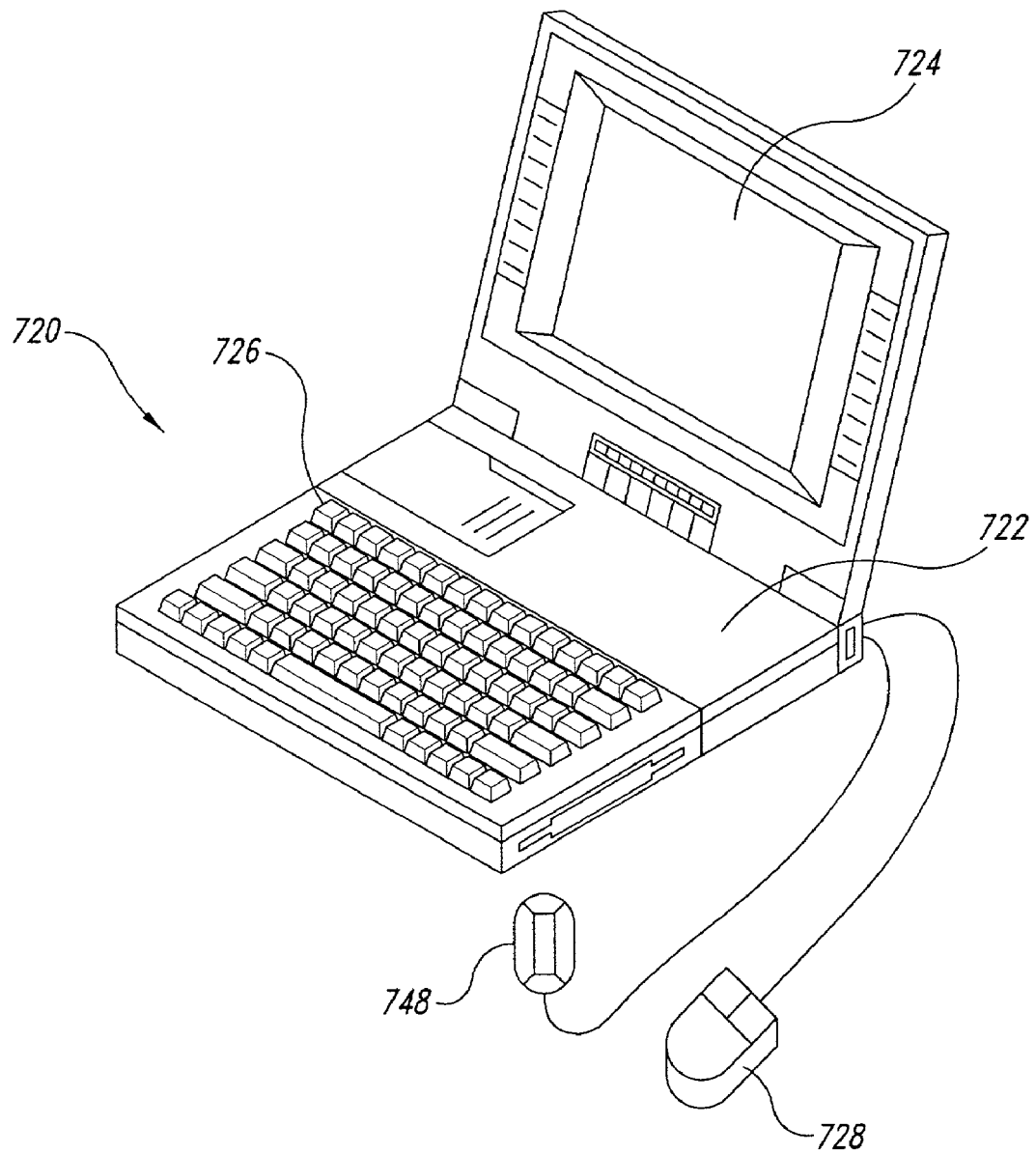
FIG. 7 shows a pictorial representation of a conventional data processing system which can be utilized in accordance with illustrative embodiments of the devices and/or processes described herein.
Figure 8:
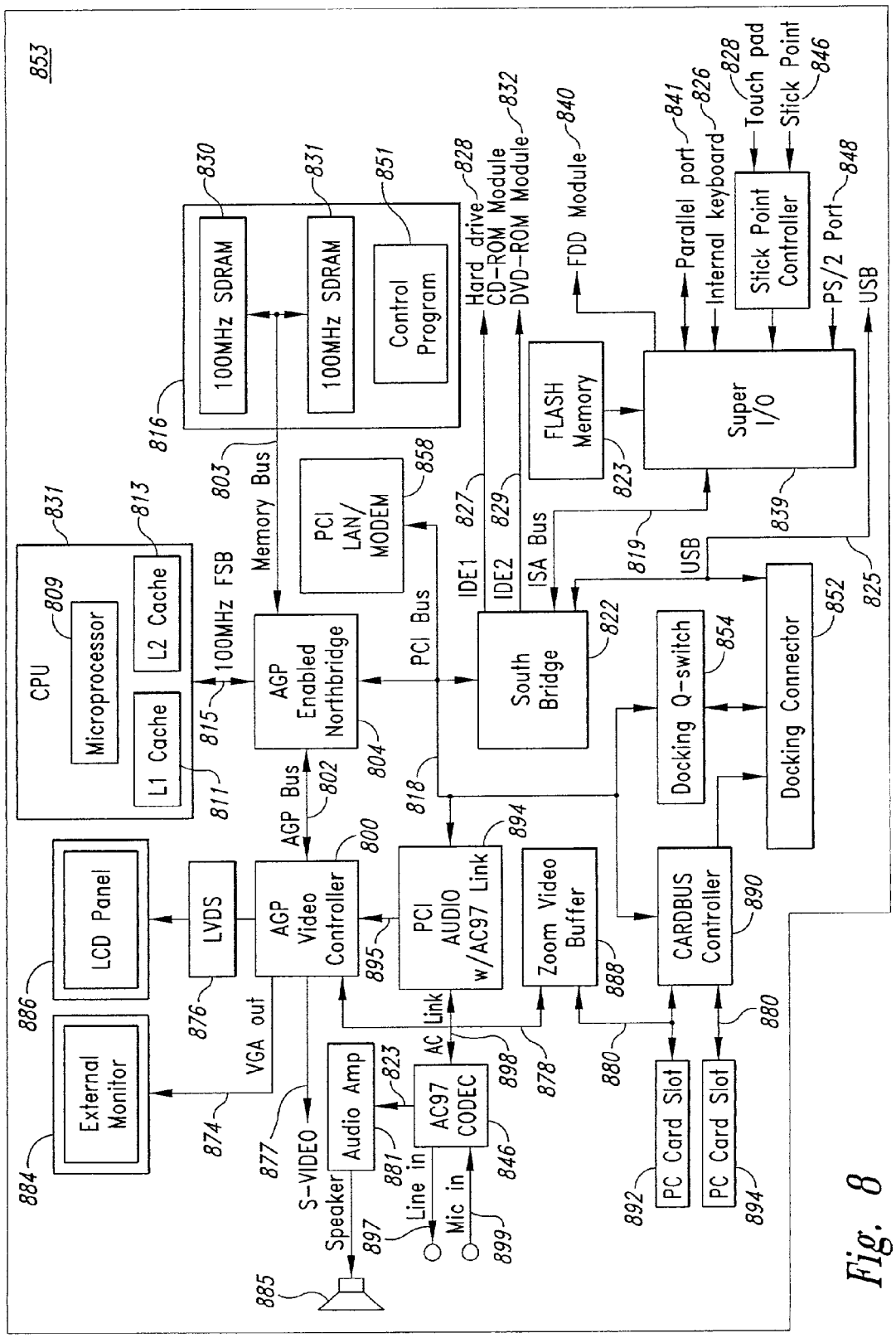
FIG. 8 depicts a data processing system motherboard 853 having selected components of data processing system 720 in which illustrative embodiments of the devices and/or processes described herein may be implemented.

Those skilled in the art will recognize that it is common within the art to describe devices and/or processes in the fashion set forth herein, and thereafter use standard engineering practices to integrate such described devices and/or processes into data processing systems. That is, the devices and/or processes described herein can be integrated into a data processing system via a reasonable amount of experimentation. FIGS. 7 and 8 show an example representation of a data processing system into which the described devices and/or processes may be implemented with a reasonable amount of experimentation.

With reference now to FIG. 7, depicted is a pictorial representation of a conventional data processing system which can be utilized in accordance with illustrative embodiments of the devices and/or processes described herein. It should be noted that a graphical user interface systems (e.g., Microsoft Windows 98 or Microsoft Windows NT operating systems) and methods can be utilized with the data processing system depicted in FIG. 8. Data processing system 720 is depicted which includes system unit housing 722, video display device 724, keyboard 726, mouse 728, and microphone 748. Data processing system 720 may be implemented utilizing any suitable computer such as those sold by Dell Computer Corporation, located in Round Rock, Tex. Dell is a trademark of Dell Computer Corporation.

Referring now to FIG. 8, depicted is data processing system motherboard 853 having selected components of data processing system 720 in which illustrative embodiments of the devices and/or processes described herein may be implemented. Data processing system 720 includes Central Processing Unit ("CPU") 831 (wherein are depicted microprocessor 809, L1 Cache 811, and L2 Cache 813). CPU 831 is coupled to CPU bus 815.

CPU bus 815 is coupled to AGP-enabled Northbridge 804, which serves as a "bridge" between CPU bus 815, AGP interconnect (or bus) 802 (a type of data bus), and system memory bus 803. In going from one type of bus to another type of bus, a "bridge" is generally needed because the two different type buses speak a different "language." The term "AGP-enabled" is intended to mean that the so-referenced components are engineered such that they interface and function under the standards defined within the AGP interface specification (Intel Corporation, Accelerated Graphics Port Interface Specification).

Generally, each bus in a system utilizes an independent set of protocols (or rules) to conduct data, which are generally set forth in a product specification uniquely tailored to the type of bus in question (e.g., the PCI local bus specification and the AGP interface specification). These protocols are designed into a bus directly and such protocols are commonly referred to as the "architecture" of the bus. In a data transfer between different bus architectures, data being transferred from the first bus architecture may not be in a form that is usable or intelligible by the receiving second bus architecture. Accordingly, communication problems may occur when data must be transferred between different types of buses, such as transferring data from a PCI device on a PCI bus to a CPU on a CPU bus. Thus, a mechanism is developed for "translating" data that are required to be transferred from one bus architecture to another. This translation mechanism is normally contained in a hardware device in the form of a bus-to-bus bridge (or interface) through which the two different types of buses are connected. This is one of the functions of AGP-enabled Northbridge 804, as well as the Southbridge 822, in that it is to be understood that such bridges can translate and coordinate between various data buses and/or devices which communicate through the bridges.

AGP interconnect 802 interfaces with AGP-enabled video controller 800, which respectively interconnects with video display devices external monitor 884 and LCD (Liquid Crystal Display) panel 886 (each of which are specific illustrations of the more general video display device 724) through VGA (Video Graphics Array) out) 874 and LVDS (Low Voltage Differential Signaling) bus 876. AGP-enabled video controller 800 also is depicted with S-Video out jack 877. AGP-enabled video controller 800 also is depicted as interconnected with zoom video buffer 888 via zoom video buffer bus 878. Zoom video buffer 888 is illustrated as interconnected with cardbus controller 890 via cardbus controller lines 880. Shown is that Cardbus controller lines 880 connect Cardbus controller 890 with PCI card slots 892 and 894.

Shown is that AGP-enabled video controller 800 interconnects with PCI audio w/AC97 link 894 via PCI audio-AGP video bus 895. Depicted is that PCI audio w/AC97 link 894 interconnects with AC97 CODEC 896 via AC97 link 898. Illustrated is that AC97 CODEC 896 has line in jack 897 and mic in jack 899. Depicted is that AC97 CODEC 896 interfaces with audio amp 881 via AC97 CODEC-audio amp bus 883. Illustrated is that audio amp 881 drives speaker 885.

AGP-enabled Northbridge 804 interfaces with system memory bus 803. System memory bus 803 interfaces with system memory 816, which can contain various types of memory devices such as SDRAM chips 830 and 849, but which also can contain DRAM, Rambus DRAM, and other type memory chips. In addition, shown for sake of illustration is that data processing system 720 includes control program 851 which resides within system memory 816 and which is executed and/or operated on by CPU 831. Control program 851 contains instructions that when executed on CPU 831 carries out application program (e.g., videoconferencing software) operations.

AGP-enabled Northbridge 804 interfaces with Peripheral Component Interconnect (PCI) bus 818, upon which are shown PCI Input-Output (I/O) devices PCI LAN/modem card 850, PCI Audio w/AC97 link 894, cardbus controller 890, and docking Q switch 854 which is depicted as electrically connected with docking connector 852. Docking connector 852 is also shown electrically connected with cardbus controller 890 and universal serial bus (USB) 825.

Depicted is that Peripheral Component Interconnect (PCI) bus 818 interfaces with Southbridge 822. Southbridge 822 serves as a bridge between PCI bus 818 and I/O (or ISA) bus 819, universal serial bus USB 825, and Integrated Drive Electronics (IDE) connectors 827 and 829, which respectively connect with hard drive CD-ROM module 828 and DVD-ROM module 832.

I/O bus 819 interfaces with super I/O controller 839. Further shown is that super I/O controller 839 connects devices flash memory 823, FDD (floppy disk drive) module 840, parallel port 841, internal keyboard 826, mouse or touchpad 828, stick point 846, and PS/2 port 848 to I/O bus 819.

Data processing system 720 typically contains logic defining at least one graphical user interface, and any suitable machine-readable media may retain the graphical user interface, such as SDRAM 830, ROM, a magnetic diskette, magnetic tape, or optical disk. Any suitable operating system such as one having an associated graphical user interface (e.g., Microsoft Windows or Microsoft NT) may direct CPU 831. Other technologies can also be utilized in conjunction with CPU 831, such as touch-screen technology or human voice control.

Those skilled in the art will appreciate that the hardware depicted in FIG. 8 may vary for specific applications. For example, other peripheral devices such as optical disk media, audio adapters, video cameras such as those used in videoconferencing, or programmable devices, such as PAL or EPROM programming devices well-known in the art of computer hardware, and the like may be utilized in addition to or in place of the hardware already depicted.

Those skilled in the art will recognize that data processing system 720 can be described in relation to data processing systems which perform essentially the same functions, irrespective of architectures.

The foregoing components and devices are used herein as examples for sake of conceptual clarity. Thus, CPU 831 is utilized as an exemplar of any general processing unit, including but not limited to multiprocessor units; CPU bus 815 is utilized as an exemplar of any processing bus, including but not limited to multiprocessor buses; PCI devices attached to PCI bus 818 are utilized as exemplars of any input-output devices attached to any I/O bus; AGP Interconnect 802 is utilized as an exemplar of any graphics bus; AGP-enabled video controller 800 is utilized as an exemplar of any video controller; Northbridge 804 and Southbridge 822 are utilized as exemplars of any type of bridge; and PCI LAN/modem card 850 is used is intended to serve as an exemplar of any type of synchronous or asynchronous input-output card. Consequently, as used herein these specific exemplars are intended to be representative of their more general classes. Furthermore, in general, use of any specific exemplar herein is also intended to be representative of its class and the non-inclusion of such specific devices in the foregoing list should not be taken as indicating that limitation is desired.

Those skilled in the art will recognize that data processing system 720 can be described in relation to data processing systems which perform essentially the same functions, irrespective of architectures.

Example Designer's Guide for a Specific Implementation of the MFD Design Tool Devices and Processes Described in FIGS. 1-8

FIGS. 1-8 and their associated texts describe a high-level general implementation of MFD design tool devices and processes. Following is a description of specific embodiments of various aspects of the general implementation of the MFD design tool devices and processes described above, as well as other embodiments. The specific embodiments will be described herein within the context of a product referred to as "MFDTool." An executable version of MFDTool can be obtained from the following URL, the entire contents (including all links and downloadable items) of which is hereby incorporated by reference in its entirety:

http://www.psych.purdue.edu/~gfrancis/MFDTool/index.html.

1 Purpose of MFDTool

MFDTool is software that helps a multifunction display (MFD) designer optimize assignment of MFD information to MFD hardware commands (e.g., button pushes). To understand how MFDTool can help in the design process; the following section describes some of the tasks involved in MFD design.

1.1 Some Difficulties of MFD Design

Many computer devices for information display involve fixed hardware switches and flexible software pages. These types of devices are called multifunction displays (MFDs) or multi-purpose displays. The information in these devices is often arranged hierarchically so that a user starts at a top level and moves down the hierarchy by selecting appropriate MFD pages. Often the hardware devices are real or simulated buttons that remain in fixed positions. Common examples of MFDs include automated teller machines, pagers, aircraft cockpit display panels, and various medical devices. As the user moves through the hierarchy, the MFD screen changes, thereby providing information to the user. The creation of effective MFDs is a difficult task, and designers must decide how many buttons to include, the hierarchical arrangement of information, and the mapping of page labels to hardware (typically buttons). MFDTool is a computer program that helps in the last of these tasks.

Before discussing what MFDTool does, it may is useful to discuss how MFDTool fits into the MFD design process. Often times a human MFD designer is simply given a standard hardware setup and told to put information "in" the device sufficient to allow the device to support a human in a particular endeavor. The selection of information to be loaded into an MFD and is a design choice within the purview of the human designer and will vary from application to application, because it involves identifying what types of information are necessary, and creating labels that are meaningful for the user and the MFD purpose.

However, once the hardware setup has been defined and the information to be loaded into the MFD defined, decisions must be made about how to map the various parts of the information hierarchy to user actions (e.g., button pushes). Mapping hierarchy information to MFD buttons is a challenging task. The human-computer interactions involved in accessing information from an MFD are complicated and not entirely understood. Moreover, even a small hierarchy database can be mapped to hardware buttons in a vast number of ways, so combinatorial explosion quickly precludes an exhaustive search of all possible mappings. Therefore such mappings are, at best, created by experts who rely on experience and general guidelines like the following:

1. Frequently used functions should be the most accessible.
2. Time critical functions should be the most accessible.
3. Frequently used and time critical functions should be activated by the buttons that feel "ideally located" (e.g., top of a column of buttons)

4. Program repeated selection of the same button. Failing that, program sequential selections to adjacent buttons.
5. The number of levels in the hierarchy should be as small as possible.
6. The overall time to reach functions should be minimized.
7. Functions that are used together should be grouped on the same or adjacent pages.
8. Related functions on separate pages should be in a consistent location.
9. Related functions should be listed next to each other when on a single page.
10. Consider the types of errors crew members might make and place functions accordingly to minimize the effect of those errors.

While many of these guidelines correctly identify the key characteristics of good MFD design, application of these criteria is problematic because they often conflict with each other. For example, should a frequently used function be placed by itself near the top of the hierarchy (1) or should it be placed in a submenu with its related, but infrequently used, functions (7)? Likewise, should criteria (3), (4) or (7) dominate selection of a button for a specific function? Currently, there is no quantitative method of measuring the tradeoffs and designers try out different options until the whole system "feels" good. This is a time consuming task because movement of a single function can require other changes throughout the MFD. As a result, MFD creation largely remains an artistic endeavor, depending primarily on the experience, intuition, and hard work of the designer.

The best artists use good tools to help them in their craft. MFDTool handles part of the complexity of measuring the impact of various guidelines. MFDTool cannot build an MFD from scratch, and the design will still depend on the experience and effort of the designer. MFDTool does allow the designer to consider a larger range of possibilities by automating part of the design process, thereby freeing the designer to focus on other tasks.

1.2 How MFDTool Helps

MFDTool focuses on a subset of the guidelines identified above that can be recast in terms of an optimization problem. MFDTool requires that the designer has a specified MFD hardware system that describes the sizes and positions of MFD buttons (the approach can be modified to other types of interfaces, but buttons are a common interface type). MFDTool also requires that the designer specifies the hierarchical arrangement of information pages in the database. MFDTool also allows for hyperlinks that move back up the hierarchy (e.g., RETURN) or function as shortcuts, as described below. Given this information, MFDTool allows the user to identify six types of constraints, which can be mixed and matched as desired. Each constraint can be imposed on different defined interactions (discussed below).

1. Global difficulty: If one ignores shortcuts and backward links, then moving through the hierarchy from top to bottom can be described by a single finite sequence of button presses. When the designer specifies the frequencies of search for different pieces of MFD information, MFDTool associates page labels with buttons in a way to minimize the average difficulty needed to reach information. This constraint corresponds to guidelines (1), (6), and often (4), above.
2. Pages to close buttons: Often labels on a single screen are related to each other and the designer wants the related page labels to be grouped together on nearby buttons. At other times labels on different MFD screens are related and the designer wants those labels to be associated to the same or nearby buttons (e.g., CANCEL should be in the same place on every page). MFDTool allows the designer to specify as many of these constraints as desired. This constraint corresponds to guidelines (8), and (9), above.
3. Pages to fixed buttons: Sometimes a designer wants to restrict a single label or multiple labels (either on the same screen or different screens) to a subset of the possible buttons (e.g., always put left engine information on the left side of the MFD screen). MFDTool allows the designer to specify as many of these constraints as desired. This constraint accommodates guideline (3) above, but also allows for more general restrictions.
4. Path difficulty: The use of some MFDs requires users to retrieve certain combinations of information. If a user has to first check the status of one system, then the status of a second, and then the status of a third, there will be a path of visited pages that correspond to this combination of information searches. Moreover, because the system information may be scattered across the MFD hierarchy, designers often include hyperlinks, or shortcuts, to the top of the hierarchy or to other MFD hierarchy locations. MFDTool allows the designer to identify these paths and acts to assign page labels to buttons to minimize the difficulty of executing these button sequences. MFDTool allows the designer to specify as many of these paths as desired.
5. Pages to far buttons: Sometimes a designer may want a set of labels to be separated as much as possible. This could be useful to insure that a user does not confuse similar labels that are functionally different. It could also help the designer organize labels into different positions on the screen. Use of this constraint likely corresponds to guideline (10), above.
6. Parent to child variability: This constraint allows a designer to impose certain types of consistency on the layout design. This constraint attempts to minimize, among specified pages, the variability (standard deviation) in interaction coefficients between the buttons assigned to a page's parent and to itself. For example, if Euclidean distance is used, then specified pages will be assigned to buttons so that clicking on the button of a page's parent will then require a move of a constant distance to reach the desired page's button. This would likely provide a consistent "motor memory" that might make learning and using the MFD easier.

In MFDTool, each constraint has a corresponding numerical cost function that measures how well a constraint is being satisfied by the current MFD design. Smaller cost values correspond to better designs relative to that constraint. An optimization algorithm searches through a variety of MFD designs to find one that minimizes (or nearly so) the sum of costs. The next two sections are fairly complex, involving a mathematical description of interactions and costs, and they can be skimmed (but not skipped) by beginners who want to learn how to use the methods of MFDTool, but are not yet interested in the underlying principles.

1.3 Interactions

MFDTool optimizes the assignment of page labels to buttons. The optimization is relative to specified cost functions. Each cost function must be defined relative to a designer-specified interaction. Each interaction is defined by a set of interaction coefficients that identify the relationships between every significant pair of buttons. For example, a Euclidean distance interaction would consist of interaction coefficients that identify the Euclidean distance between each pair of buttons. As another example, some MFDs have the user push arrow keys to "tab" through buttons. The interaction coefficients here might indicate the number of pushes that are required to go from one button to another. Interaction coefficients need not be true distances in the mathematical sense. For example, in some situations it may be easy to go from the left side of the MFD to the right side, but difficult to go the other way. The interaction coefficients that would define such a relationship would not be symmetrical, and hence would not correspond to a true distance. Nevertheless, a designer can generally think of the interaction coefficients as identifying how difficult it is for a user to go from one button to another. Larger numbers indicate more difficulty. The task of MFDTool is to assign page labels to buttons to minimize cost functions relative to the interaction coefficients. In general, a designer can specify the interaction coefficients to be whatever is desired. It may be a difficult task in some instances to specify the interaction coefficients for a particular MFD. It requires an understanding of the human-computer interface, and perhaps a model of how the user will interact with the interface. In principal, this type of analysis should be carried out for any human-computer interaction design. MFDTool does provide a means of calculating five sets of interaction coefficients that correspond to some types of human-computer interactions. These are described below.

1.3.1 Fitt's Movement

A common form of interaction with an MFD is finger-pointing, where a user presses buttons by moving his finger (or perhaps a mouse or pointer pen) from one button to another. There is a well established model of how long it takes people to move a pointer over a given distance to a target of a given size. MFDTool uses a form of Fitt's Law that says that the movement time, I[i, j] between button i and button j is:

$$I[i, j] = I_m \log_2\left(\frac{2H_{ij}}{S_j} + 1\right). \quad (1)$$

Here, $H_{ij}$ is the center-to-center Euclidean distance between the buttons; $S_j$ is the size of the second button (defined as the minimum of button height and width), log 2 is the logarithm in base 2, and $I_m$ is a parameter with units milliseconds/bit. $I_m$ is empirically measured, and, for finger movements, values between 70 and 120 ms/bit are common. MFDTool uses $I_m$=100 ms/bit. In the context of moving through an MFD hierarchy of information, Fitt's Law is almost surely a lower limit of execution time, as a user may need to read labels to remember which button to press next.

1.3.2 Euclidean Distance

This set of interaction coefficients describes the physical distance between button centers. The interaction coefficient for two buttons i and j, centered on $(x_i, y_i)$ and $(x_j, y_j)$, respectively, is computed as $$I[i,j]=\sqrt{(x_i-x_j)^2+(y_i-y_j)^2}.$$

1.3.3 City-Block Distance

This set of interaction coefficients describes the city-block distance between button centers. The interaction coefficient for two buttons i and j centered on $(x_i, y_i)$ and $(x_j, y_j)$, respectively, is computed as $$I[i,j]=|x_i-x_j|+|y_i-y_j|,$$

where | | indicates absolute value.

1.3.4 X-Directed

This set of interaction coefficients describes the horizontal distance and direction of button centers. The interaction coefficient for two buttons i and j centered on $(x_i, y_i)$ and $(x_j, y_j)$, respectively, is computed as $$I[i,j]=x_j-x_i.$$

Position (0, 0) corresponds to the upper left corner of the MFD screen. A positive interaction coefficient indicates that the second button is to the right of the first. A negative coefficient indicates that the second button is to the left of the first. This coefficient does not really indicate difficulty of movement between a pair of buttons, but the absolute value of this coefficient would indicate the horizontal distance between buttons.

1.3.5 Y-Directed

This set of interaction coefficients describes the vertical distance and direction of button centers. The interaction coefficient for two buttons i and j centered on $(x_i, y_i)$ and $(x_j, y_j)$, respectively, is computed as $$I[i,j]=y_j-y_i.$$

Position (0, 0) corresponds to the upper left corner of the MFD screen. A positive interaction coefficient indicates that the second button is above the first. A negative coefficient indicates that the second button is below the first. This coefficient does not really indicate difficulty of movement between a pair of buttons, but the absolute value of this coefficient would indicate the vertical distance between buttons.

1.4 Constraint Costs

For each interaction, the designer can associate any number of constraints. MFDTool acts to minimize the cost functions associated with these constraints. This section mathematically defines the cost functions.

1.4.1 Global Difficulty

When a sequence of button presses, $b_1, b_2, \ldots, b_m$, is to be executed during access of information, MFDTool adds up the interaction coefficients related to moving from the first button to the second, the second button to the third, and so on. Thus, the total difficulty executing a sequence of button presses will be:

$$D = \sum_{i=1}^{m-1} I[b_i, b_{i+1}], \quad (2)$$

where there are m button presses in the sequence, and I[$b_i$, $b_{i+1}$] is the interaction coefficient between successive buttons.

Once the interaction model is defined by specification of all the I[$b_i$, $b_{i+1}$] terms, MFDTool can calculate the total difficulty involved in reaching a desired information label by looking at the sequence of button pushes necessary to reach that page label from the top level of the MFD hierarchy. The cost function for global difficulty is the average difficulty needed to reach any MFD page label, for a given interaction:

$$C_1 = \sum_{j=1}^{n} D_j p_j, \quad (3)$$

where n is the number of information labels in the hierarchy, $D_j$ is the total difficulty involved in executing the sequence of button presses to reach page label j, and $p_j$ is the proportion of time that page label j is needed by the user. As the assignment of page labels to buttons is modified, the value of $D_j$ changes. MFDTool tries to assign page labels to button presses so that labels with larger $p_j$ values have smaller $D_j$ values, thereby minimizing average difficulty.

1.4.2 Pages to Close Buttons

To help users learn and remember where information is located on an MFD screen, designers often group sets of labels to be on nearby locations. A commonly used technique is to place labels that are related to each other on nearby buttons. A designer may, for example, want to create ordered lists of items on a single MFD screen and may also want to insure that related labels on different screens are associated with nearby buttons.

MFDTool defines "closeness" relative to the interaction coefficients between buttons. Thus, if a designer constrains page labels $L_1, \ldots, L_k$ to be as close as possible, and they are currently assigned to buttons $b(L_1), \ldots, b(L_k)$, then the quantitative cost of these assignments is:

$$C_2 = \sum_{i=1}^{k} \sum_{j=1}^{k} I[b(L_i), b(L_j)]. \quad (4)$$

Here $I[b(L_i), b(L_j)]$ is the interaction coefficient from button $b(L_i)$ to button $b(L_j)$. If the interaction defines a distance, then $C_2$ equals zero when the labels in this constraint are all on different pages and are associated with the same button. If some of the labels are on the same screen, then $C_2$ will likely have a nonzero minimum, as two labels cannot simultaneously be associated with the same button on the same screen. Whichever the case, MFDTool tries to assign information labels to buttons in a way that minimizes $C_2$.

1.4.3 Pages to Fixed Buttons

Sometimes a designer may want to constrain some page labels to a particular button or set of buttons. This could occur for example, if a designer, to stay consistent with other displays, wants an EXIT label always placed on the lower left button. Or, a designer may want geographical topics to have corresponding positions on the MFD screen (e.g., left to left). All of these constraints can be imposed in MFDTool.

This constraint cost measures how close the page labels are to their restricted buttons. As with the other costs, MFDTool defines "closeness" relative to the interaction coefficients between buttons. Thus, if the designer constrains page labels $L_1, \ldots, L_k$ to be restricted to buttons $b_1, \ldots, b_h$, and each label is currently assigned to buttons $b(L_i), b(L_k)$, then the quantitative cost of these assignments is:

$$C_3 = \sum_{i=1}^{k} \min_{j=1,\ldots,h} I[b_j, b(L_i)]. \quad (5)$$

The term inside the summation compares the currently assigned button for label $L_1$ with each of the allowable buttons and takes the minimum interaction coefficient. Thus, if the interaction defines a distance, then when all labels are assigned to one of the allowable buttons the minimum interaction coefficients are zero and the total cost is zero. When a constrained label is not assigned to an allowable button, the cost is incremented by the minimum interaction coefficient between the assigned button and one of the allowable buttons.

1.4.4 Path Difficulty $C_1$, above, measures the average difficulty required to search for a page label, starting from the top of the hierarchy and taking the most direct route to that label. However, depending on the MFD, not all searches are of that type. It is frequently the case that a user needs to gather a number of different types of information from different screens in the MFD.

The designer may include shortcuts or hyperlinks that allow the user to quickly travel along such paths of pages. Cost $C_1$ cannot account for these types of situations because the use of shortcuts means that there are multiple (usually infinitely many) ways to reach a label. For these types of situations, the designer must specify the sequence, or path, of pages the user goes through to perform a required task. Once this path is specified, MFDTool acts to minimize the interaction coefficients along that path by associating page labels to buttons, much as for cost $C_1$.

The quantitative definition of cost is much as for $C_1$, except the designer must identify the path of page labels that the user steps through (for $C_1$ the computer could do this because each page label has a unique position in the hierarchy). The designer identifies an ordered sequence of page labels $L_1, \ldots, L_k$ for which total difficulty is to be minimized. If each page label is currently assigned to buttons $b(L_1), \ldots, b(L_k)$, then the quantitative cost of these assignments is:

$$C_4 = \sum_{i=1}^{k-1} I[b(L_i), b(L_{i+1})]. \quad (6)$$

MFDTool tries to minimize this cost through the assignment of page labels to buttons. In some MFD applications, minimization of difficulty along these paths may be the most important job for the designer. By their very nature, such sequences must be specified by the designer.

1.4.5 Pages to Far Buttons

To help users learn and remember where information is located on an MFD screen, designers often group sets of labels to be at distinctive locations. A commonly used technique is to place labels that are unrelated to each other on buttons that are separated on the display.

MFDTool defines "farness" relative to the interaction coefficients between buttons. Thus, if a designer constrains page labels $L_1, \ldots, L_k$ to be as far apart as possible, and each label is currently assigned to buttons $b(L_1), \ldots, b(L_k)$, then the quantitative cost of these assignments is:

$$C_5 = \sum_{i=1}^{k} \sum_{j=1}^{k} (I_{max} - I[b(L_i), b(L_j)]). \quad (7)$$

Here I max is the largest possible interaction coefficient between any buttons on the display and $I[b(L_i), b(L_j)]$ is the interaction coefficient from button $b(L_i)$ to button $b(L_j)$. This constraint is most useful for an interaction that defines a distance, so that $C_5$ equals zero when the labels in this constraint are as far apart as possible. It may not be possible to drive $C_5$ to zero when there is a larger number of constrained pages than can be placed on the farthest apart button pairs.

1.4.6 Parent to Child Variability

Guideline (8) suggests that related functions on separate pages should be placed on similar locations. More generally, this guideline suggests that the position of functions should be consistent across the MFD design. However, the guideline only specifically mentions positional consistency. There are other types of consistency that a designer might also want to consider.

If the MFD interaction requires movement of the arm or hand, there may be motoric memory of the motions required to access information. For these types of interactions, there may be an advantage for a design that provides consistency of movements, rather than consistency of locations. For example, perhaps a Cancel button should always be located opposite the just selected button. This would make the Cancel button assigned to different buttons on different screens, but in a consistent relative location across screens. If a designer decides that this type of consistency is important for their system, then this constraint can be used to describe a cost for violating a specified consistency.

If a designer constrains page labels $L_1, \ldots, L_k$, each with a hierarchical parent page $P_1, \ldots, P_k$, to be in a consistent relative location as the user goes from the $P_i$ to $L_i$, and each label is currently assigned to buttons $b(L_1), \ldots, b(L_k)$, then the quantitative cost of these assignments is:

$$C_6 = \sqrt{\frac{\sum_{i=1}^{k} I[b(P_i), b(L_i)]^2 - \sum_{i=1}^{k} I(b(P_i), b(L_i))^2 / k}{k}} \qquad (8)$$

This equation is basically a calculation of standard deviation. $I[b(P_i), b(L_i)]$ is the interaction coefficient from the button of the hierarchical parent of label $L_1$, $b(P_i)$, to button $b(L_i)$. The standard deviation of these interaction coefficients is the cost for this constraint. If used with the X-directed and Y-directed interactions, this constraint allows for direction-specific consistency across page label locations. If all the interaction coefficients of constrained pages are the same, the cost is zero.

1.5 Weighting Costs

The designer needs to identify the relative importance of different constraints so that MFD-Tool produces the desired result. It is common for constraints to be in conflict with each other. In anticipation of such conflicts the designer needs to indicate a weight, $\lambda$, for each constraint cost. For example, if the designer wants to be certain that the EXIT label is always on the lower left button, even if such assignment means an increase in other costs, then the weight for the EXIT constraint might be set larger than the weights for other costs. MFDTool tries to minimize the weighted sum of constraint costs:

$$C = \sum_{i=1}^{n} \lambda_i R_i. \qquad (9)$$

Here, there are n constraints defined by the user, and $R_i$ corresponds to the cost associated with constraint i. There is no way for MFDTool to advise the designer on how to set the weights. The default is the value one, but it is merely a starting point and not intended as a reasonable choice. The values of the weights have a great effect on the resulting MFD design, and it is not unusual for a designer to tweak the weights to insure that one constraint is satisfied over another. The use of extremely large weights, relative to others, is often not effective because it sometimes hinders the optimization process (next section). In general, the designer should set the weight on a constraint just high enough to insure that the constraint is satisfied. This often involves trial and error.

1.6 Optimization

Once a total cost function is defined, one can use any number of algorithms to find the assignment of page labels to buttons that minimizes that cost function. MFDTool currently includes two optimization techniques: gradient descent and the simulated annealing algorithm.

The gradient descent algorithm is a variation of hill-climbing algorithms. In a hill-climbing (or hill-descending, only the sign needs to be changed) algorithm, the system is initialized to a particular state (e.g., mapping of labels to buttons) and the cost is calculated for that state. One of the variables of the problem (e.g., a label) is randomly selected and modified (e.g., moved to a new button). A new cost value is calculated, and if the new cost is less than the old cost, the change is kept, otherwise the change is undone. In this way, the system converges to a state where any change would lead to an increase in cost (e.g., where any change in the mapping would be worse). Hill-climbing techniques have a tendency to get stuck in local minima of cost because they never accept changes that increase cost. In complex problems, hill-climbing methods can easily get trapped in a state where any change only increases cost but the global minimum is very different, with a much smaller cost. To avoid this problem, MFDTool proceeds through many runs of the optimization with different random initial designs, and keeps track of the overall best design. The success of this approach depends on the complexity of the cost-space of the system (which is generally unknown). In practice, this algorithm is fast and often ends up with a good optimization.

Simulated annealing is another variation of hill-climbing algorithms that addresses the local minima problem by introducing a controlled way to climb out of local minima and end in a state with the global minimum of cost. By analogy, one would probably, at some point during a hike, need to go down a ravine or a small slope to climb to the top of a mountain. Simulated annealing is a stochastic algorithm that at first accepts changes even if they lead to larger costs. As time progresses a temperature parameter gradually decreases (this is the annealing) so that it becomes less likely that a change leading to an increase in cost is accepted. As the temperature becomes small the algorithm becomes essentially hill-climbing. As long as the temperature decreases slowly enough and enough changes are considered at each temperature level, simulated annealing is statistically guaranteed to find the global minimum of a problem. In practice, though, the necessary temperature schedule is too slow and the number of changes at each level is too large, so simpler approaches are taken that are faster, but less certain to find the global minimum.

In simulated annealing, the initial temperature, T, is set large enough that many state changes are accepted even if they lead to a cost increase. Changes are made by randomly selecting an MFD page label. Its button assignment is noted, and a new button assignment is randomly selected. The selected label swaps positions with whatever (perhaps nothing) is at the new button assignment. After each change, new cost, $C_{new}$, is calculated and compared to the cost before the change, $C_{old}$. The change in cost, $\Delta C = C_{new} - C_{old}$, is calculated. If the cost change is negative, the change is kept. If the cost change is positive, the change is kept when a random number between zero and one is greater than $$p = \exp(-\Delta C/T). \qquad (10)$$

This relationship means that when $\Delta C$ is much smaller than T, p is close to one, and lots of changes are kept. As T gets smaller than $\Delta C$, p gets closer to zero, and changes are not kept very often. Statistically then, the system is more likely to be in a state with a low cost. As T decreases, the system tends to be stuck in a state with very low cost.

To insure that the statistical situation is close to reality, one needs to implement many changes at every temperature level. After these changes, the temperature is multiplied by a number between zero and one. The process is then repeated for the new temperature. The whole process stops when it seems that the temperature is so small that the system is trapped in a particular state (as in hill-climbing). MFDTool reaches this conclusion when several changes in temperature have not produced any changes in cost.

At the end of the simulated annealing process, the system should be in a state with a low (but perhaps not optimal) cost. Being certain of finding the true optimal state with the absolute lowest possible cost would be prohibitively difficult and would likely require a supercomputer, even for relatively small MFDs.

In theory, simulated annealing should give a better optimized result than the gradient descent algorithm. However, in practice simulated annealing's performance depends on the parameters selected, so in many instances the gradient descent procedure is preferable.

2 Running MFDTool

You can download the most recent version of MFDTool from the following URL, the entire contents (including all links and downloadable items) of which is hereby incorporated by reference in its entirety:

http://www.psych.purdue.edu/~gfrancis/MFDTool/index.html

The most recent version of this designer's guide will also be at the same web address. There is no installation procedure, simply put the files in a directory of your choosing.

MFDTool is written in Java, so it will run on any computer operating system that has a working Java virtual machine (VM). Java VMs are available for nearly every modern operating system; so, in principle, MFDTool should run almost anywhere. MFDTool does not come with a Java VM, but one can be freely downloaded from http://www.javasoft.com. You will need to download either the Java Development Kit (JDK) or the Java Runtime Environment (JRE). The JDK is necessary if you intend to modify and recompile the Java source code. The JRE will allow you to run the compiled code. (Although many web browsers include a Java VM, they cannot run MFDTool. MFDTool must read from and write to the computer's hard drive, and the Java VM in web browsers prohibits such actions.)

Figure 9:
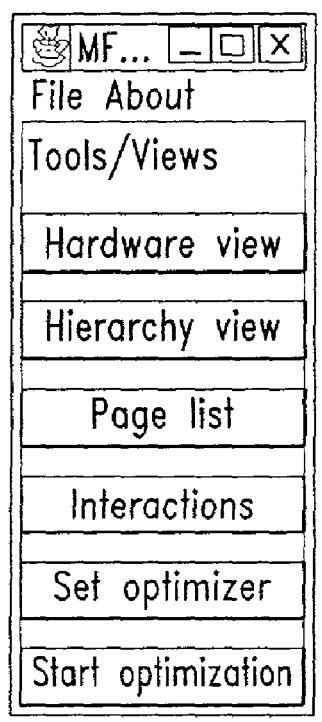
FIG. 9 illustrates the MFDTool startup window, as seen in Windows 98.

Different operating systems integrate Java in different ways. With Microsoft Windows 95/98/NT, a Java program is started in a DOS window. In a DOS window go to the 12 directory containing the MFDTool files and type java MFD-Tool and then hit the return key. A window should appear like that in FIG. 9, although it will vary somewhat from one operating system to another.

MFDTool needs three basic types of information: a description of the MFD hardware components, a description of the hierarchical arrangement of information, and designer-specified interactions and constraints that allow MFDTool to decide how the information should be mapped to the hardware components. In earlier versions of MFDTool, each MFD needed to be completely designed from scratch. MFDTool 1.2 introduces the capability to modify the hardware, hierarchy, interaction, and constraint information so that it may be easier to copy and edit a previously created MFD (a sample is included). Nevertheless, the instructions for creating a new MFD are described below for completeness.

2.1 Opening a New MFD

From the MFDTool start window select the File menu, and select New. An open file window should appear. Go to the directory Examples/ATM and open the file ATM.hdw. The buttons on the MFDTool window will become clickable. The properties of the ATM directory and the ATM.hdw file are discussed below in the MFD hardware section.

2.2 Saving an Opened MFD

From the MFDTool start window select the File menu, and select Save. A save file window should appear. Go to the desired directory and save the file. It is recommended that you use the extension .mfd, but this is not technically necessary.

2.3 Opening a Previously Saved MFD

From the MFDTool start window select the File menu, and select Open. An open file window should appear. Go to the directory Examples in the MFDTool directory and open the file ATM.mfd. The buttons on the MFDTool window will become clickable.

3 MFD Hardware

MFD hardware corresponds to the size of the MFD screen, the number of buttons, the size of each button, and the location of each button on the MFD screen. MFD hardware information can be specified at the creation of a new MFD, and can be edited on an open MFD. An MFD Hardware window is designed to give an idea of the current assignment of information labels to buttons. This allows the designer to determine whether the assignment is consistent with what was intended. This window provides mechanisms for editing hardware information and also interacts with other tools in MFDTool.

3.1 Creating a New MFD Hardware Description

The hardware description includes the number of buttons, their size, and their spatial arrangement. This information is provided by the designer in a single text file. FIG. 10 shows how the MFD hardware information is coded into a format for MFDTool to understand. The first line of the file contains the name of the MFD, which in this case is ATM. An ampersand (&) follows the name, and any comments can be placed after the ampersand without being read by MFDTool.

The second line contains information on the physical dimensions of the MFD, again ending with an ampersand, which can optionally be followed by comments. The first number on the line is the x-dimension (horizontal width) of the MFD in inches. The second number on the line (the numbers are separated by a single blank space) is the y-dimension (vertical height) of the MFD in inches.

The third line is not read by MFDTool, but acts as a visual separator for the designer between the earlier information and information about MFD buttons. Each remaining line specifies details about the size and position of a button on the MFD. As the comments to the right of the ampersand on each line indicate, the first number on each line is the horizontal width of the button and the second line is the vertical height of the button. The third and fourth numbers are the x and y positions of the upper left corner of the button, as measured from the upper left corner of the MFD frame. All numbers are measured in inches. The very last line contains only two ampersands, which tell MFDTool that there are no more buttons.

Figure 11:
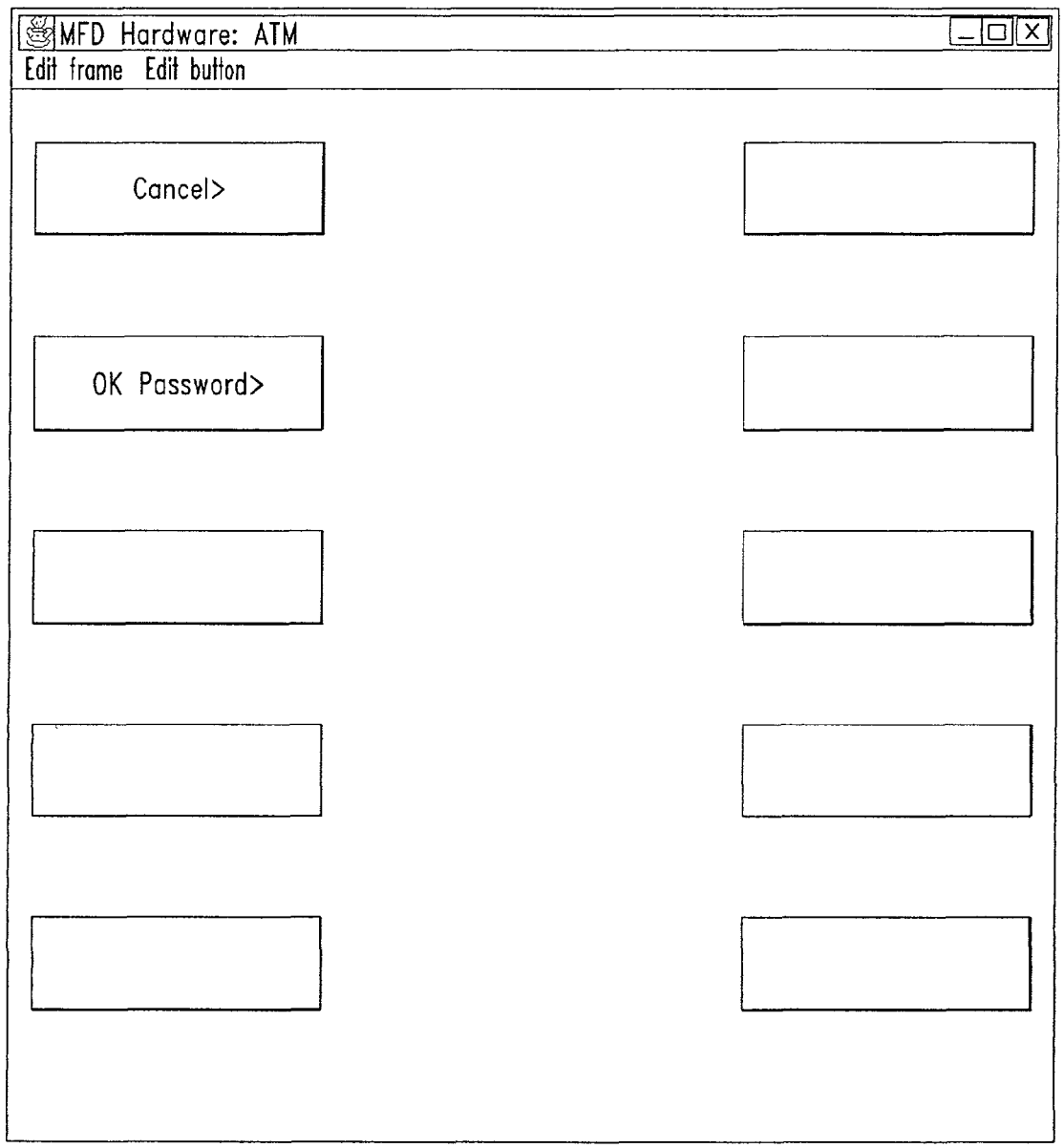
FIG. 11 depicts the MFD Hardware window showing the physical layout of the MFD and its buttons, as specified in the file ATM.hdw.

FIG. 11 shows what the window titled MFD Hardware: ATM should look like on Windows 98. The size of the window is (roughly) six by six inches, and the size and placement of buttons should correspond to the details specified in the file ATM.hdw. (Even if the size and placement are off slightly, rest assured that the information used by MFDTool is exactly as specified in the file. Sometimes Java windows and buttons are created slightly different than as specified. The calculations of distance and sizes (which are involved in the MFDTool defined interfaces) will be based on the designer-supplied numbers and not on how the MFD Hardware window looks.)

Notice that the two top left buttons have text (OK Password and Cancel) on them. This text corresponds to page labels that are currently associated with these buttons. Not all of the text may be visible on a button, but this should be of no concern. MFDTool does not try to exactly emulate what the MFD hardware will look like. Many devices place the text to one side of buttons, while others place the text directly on the buttons. MFDTool does not distinguish between these display types. It only cares about the association between the label and the button. Likewise, MFDTool does not consider whether label text will fit on a button or next to a button. The designer must handled these types of concerns by choosing appropriate text and font sizes. More generally, the actual text of the labels is for the benefit of the designer (and ultimately the user), but MFDTool makes no use of the text itself.

Figure 12:
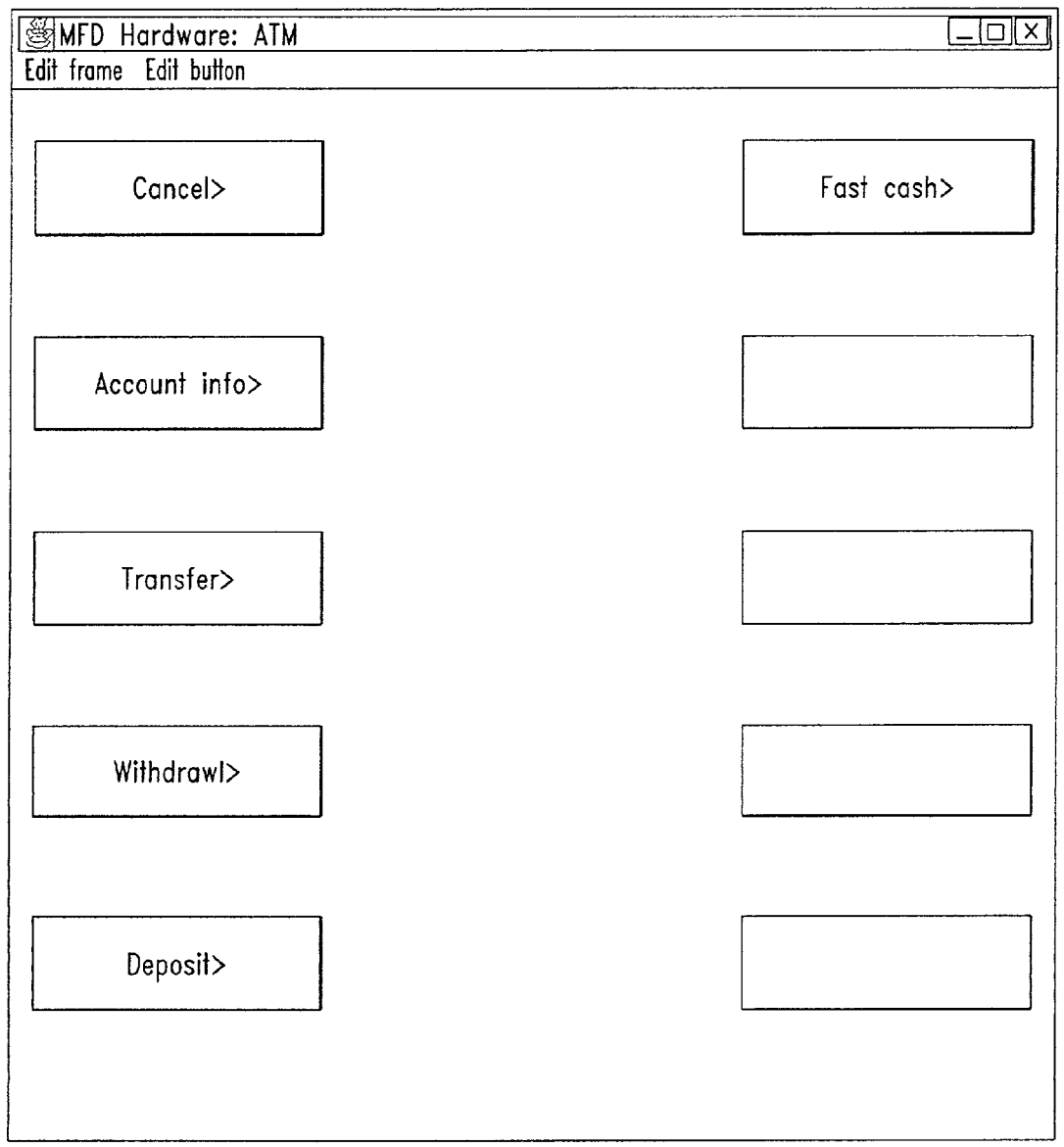
FIG. 12 illustrates the MFD Hardware window after selecting the OK Password label and shows the labels on the selected page.

Clicking on a button with a label reconfigures the MFD hardware window to show the con-tents of the page associated with that label. After selecting OK Password, the MFD Hardware window will look like the screenshot in FIG. 12, with new labels on the buttons. The click "moved" the displayed page down one level in the hierarchy to show the contents of the OK Password page. You can continue to select labels to move further down the hierarchy. However, you cannot yet move back up the hierarchy because any necessary hyperlinks that would move up the hierarchy have not been specified (below).

3.2 Editing MFD Hardware

Figure 13:
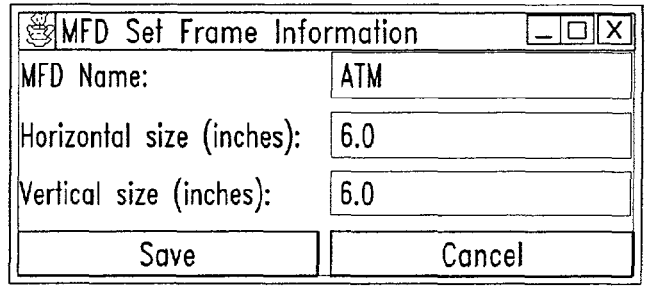
FIG. 13 shows the MFD Set Frame Information window allowing the designer to modify the name of the MFD and set the size of the MFD frame.

Once an MFD is loaded into MFD tool, a designer can edit hardware information through the pull-down menus on the MFD Hardware window. FIG. 13 shows the MFD Set Frame Info window that appears upon selection of the Edit frame menu. In this window the designer can set the size of the MFD frame, and can also modify the name of the MFD (this name appears on the titles of each MFDTool window).

Figure 14:
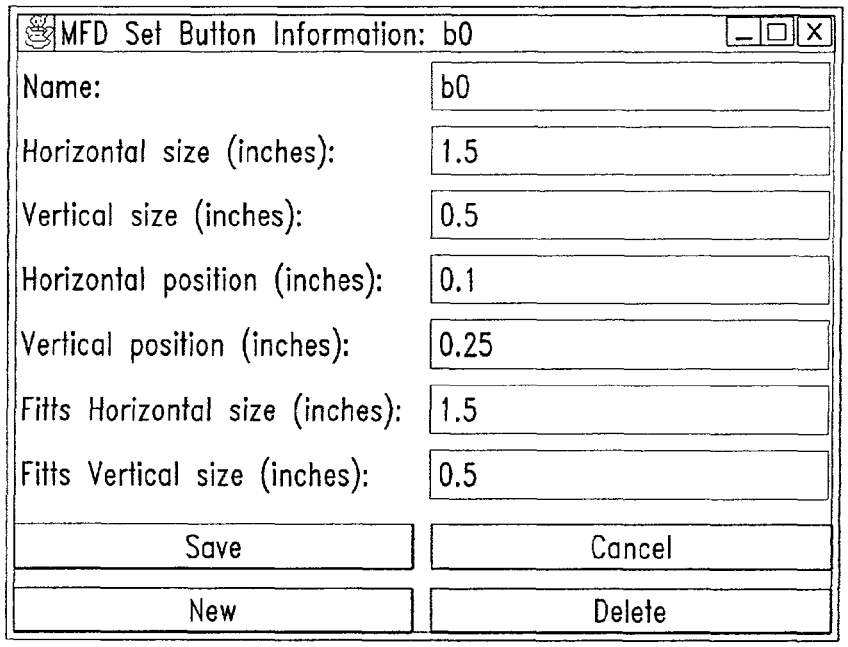
FIG. 14 depicts the MFD Set Button Information window allowing the designer to modify button properties, delete a button, and create a new button.

Choosing the Edit button pull-down menu from the MFD Hardware window reveals a menu item for each button (initially named b0, . . . b9, according to their location in the .hdw file when the MFD was first created). Selecting the menu item b0 causes the pop-up of the window shown in FIG. 14. From this window, the designer can provide a more informative name for a button (e.g., Upper Left would be more informative than b0). The designer can also modify the size and location of the button.

The Fitts sizes allow a designer to specify virtual sizes that should be incorporated in the calculation of Fitt's Law. This is useful when the sides of the MFD restrict movement beyond the edge of the screen. In such a case a user can make a ballistic movement toward a corner and know that he will stop moving at the corner. If the button is directly on that corner, then very fast movements can be made to corner buttons. This can be emulated in the calculations of Fitt's Law by giving these corner buttons very large sizes. If none of these issues concern you, just leave these numbers alone, their default sizes are the same as the physical size of the buttons.

Entering information in the MFD Set Button Information window and clicking on the New button creates a new button with the specified information. Clicking on the Delete button deletes the selected button (whether any information has been changed or not). There is no undelete feature, so use the delete command carefully.

Any changes made to the MFD hardware are automatically updated in other components of MFDTool. In some cases changes in MFD hardware may require additional effort from the designer to update some constraints (e.g., that involved a now deleted button) or interactions (e.g., to define new interaction coefficients). By default, deleted buttons are removed from any constraints that involved them, interaction coefficients are removed for a deleted button, and interaction coefficients for a new button are set to zero. Changing the size or location of a button does not force an update of its interaction coefficients, which must be done by the designer.

4 MFD Hierarchy

An MFD hierarchy corresponds to labels and their hierarchical arrangement. MFD hierarchy information can be specified at the creation of a new MFD, and can be edited on an open MFD. Information on the individual pages of the hierarchy can be viewed in an MFD Page List window, while movement up an down the hierarchy is facilitated by an MFD Hierarchy window.

4.1 Creating a New MFD Hierarchy

The text of labels and their hierarchical arrangement must be provided by the designer. A new hierarchy is produced by creating a directory structure using your operating system's file manager to create directories and files. MFDTool reads in this file structure and interprets the names of the directories and files as text labels for the MFD.

Using your operating system's file browser open the MFDTool folder. Under Examples is a directory titled ATM. Open that directory, inside is the file ATM.hdw, which was discussed above. There is also a directory called Start. The Start directory is the top page of the MFD hierarchy (it can be called anything, but there should be only one directory with the *.hdw file). The Start directory contains two directories titled Cancel and OK Password, which correspond to the text labels in FIG. 11. The OK Password directory contains additional directories and files that correspond to the text labels in FIG. 12.

The set of page labels for the ATM example is defined as the directories and files under the Start directory, with the MFD hierarchy matching the file hierarchy. To create your own set of MFD information, simply create a directory and place a *.hdw file in it (with the specified description of the physical aspects of the MFD) and then create a directory structure of the information. MFDTool reads in the information to create pages and labels for those pages. The only restriction on page names is that files should not end in the extension .hdw or .mfd, as MFDTool reserves those extensions for the description of the MFD hardware and for saving an entire MFD (as discussed above). Some operating systems also place restrictions on directory and file names (e.g., disallowing blank spaces or special characters). When reading the contents of a directory from the file system, MFDTool reads in only as many files as can possibly be assigned to buttons. If there are more files than buttons, exactly which files are read likely varies among operating systems.

MFDTool distinguishes between three types of MFD pages. A parent is a page such that when that page's label is selected the MFD screen changes to reveal the contents of the page, which contains new page labels that can also be selected. A terminator is a page that, when its label is selected, the MFD screen may reveal additional information, but does not show new labels for new pages that can also be selected. A hyperlink is a page that, when its label is selected, the MFD jumps to another page someplace else in the hierarchy. Hyperlinks allow the designer to provide shortcuts between distant MFD pages. Hyperlinks also can provide a means to move up the MFD hierarchy structure, when required.

The designer specifies these types of pages in the directory file structure. Each instance of a directory in the file structure is interpreted as a parent page. For each file, MFDTool reads the first line of the file. If that first line consists solely of the word HYPERLINK, then the page is taken as a hyperlink, otherwise the page is taken as a terminator. If the designer wants to constrain a special sequence of searches that utilizes hyperlinks, the target page of the hyperlink must be identified. Details of how to do this are discussed below.[1]

[1] Shortcuts and hyperlinks can be created in most operating systems' file systems. However, the methods of doing this vary dramatically. To retain platform independence, MFDTool provides an internal means of specifying hyperlinks.

Each page has a name associated with it (the name of its associated directory or file), and that name is the text of the label that, when selected, shows the contents of the page. For a terminator, selecting the button with its label has little effect because MFDTool is not concerned with the content shown on a page, only with the ordering of pages that might be "children" of a parent page.

Figure 15:
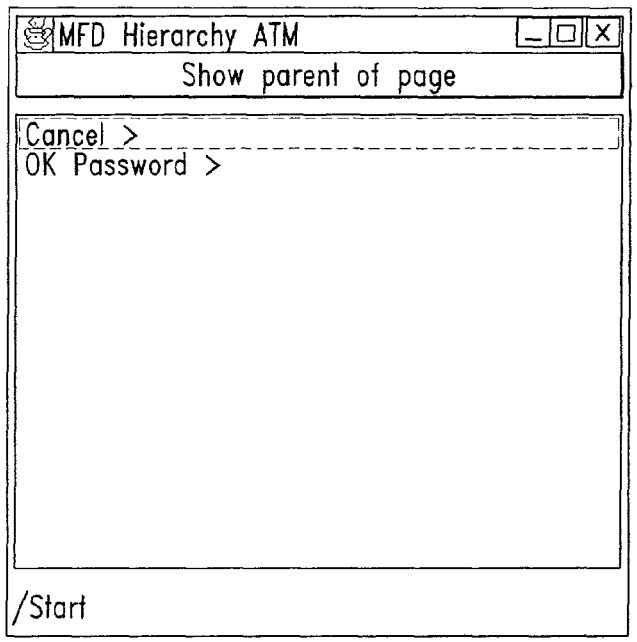
FIG. 15 illustrates a MFD Hierarchy window as it appears after opening the file ATM.hdw.

The MFD information is displayed in multiple ways. First, as already noted above (FIGS. 11 and 12), the MFD Hardware window shows the MFD information, with each page name as text on its currently associated button. Second, an MFD Hierarchy window provides a listing of the contents of the currently selected page. FIG. 15 shows what this type of window looks like after loading the file ATM.hdw as above. The names associated with parent pages are given an additional ">" at their end, so the designer can quickly recognize that selecting such a page will produce movement in the hierarchy.

Figure 16:
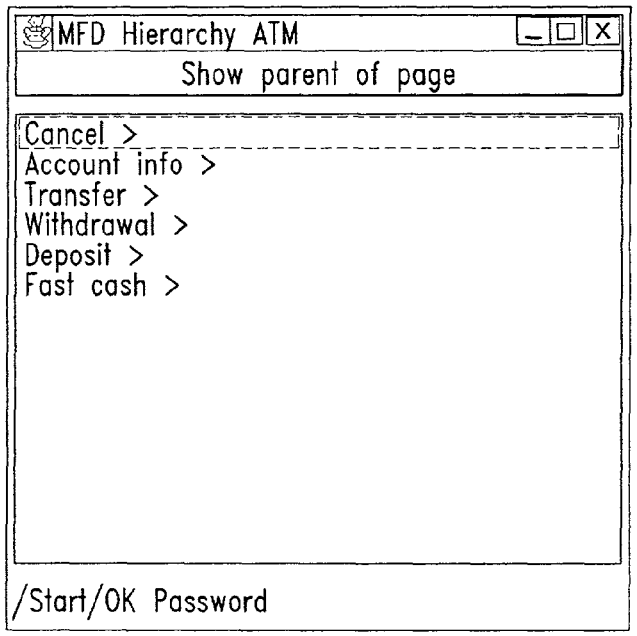
FIG. 16 shows the MFD Hierarchy window as it appears after selecting the page name OK Password.

Movement through the hierarchy of information is done by selecting a text row. Such a selection has several effects. First, the MFD Hierarchy window changes to show the contents of the selected page (FIG. 16). Second, the MFD Hardware window also changes. The two windows are (almost) yoked so that changes to one results in changes to the other. There is an exception to this yoking for terminators and hyperlinks, as described below. Third, a status line at the bottom of the MFD Hierarchy window shows the path of pages leading to the currently selected page. This helps the designer keep track of which page is currently selected in the hierarchy. From the MFD Hierarchy window, the designer can move up the hierarchy by selecting the Show parent of page button, which automatically moves up to the parent of the currently selected page.

The yoke between the MFD Hardware and MFD Hierarchy windows is not absolute. For example, selecting a terminator page in the MFD Hierarchy window makes that page the currently selected MFD page and allows the designer to impose constraints on that page (described below). On the MFD Hardware window, there is no noticeable change in the MFD buttons, because MFDTool does not show contents of a terminator page but instead shows the contents of the page's parent. Also, selecting a hyperlink in the MFD Hierarchy window does not automatically cause the MFD Hardware window to jump to the hyperlink target. Once selected in the MFD Hierarchy window, clicking on the name of the hyperlink a second time will cause the MFD Hardware window to jump to the hyperlink target.

Figure 17:
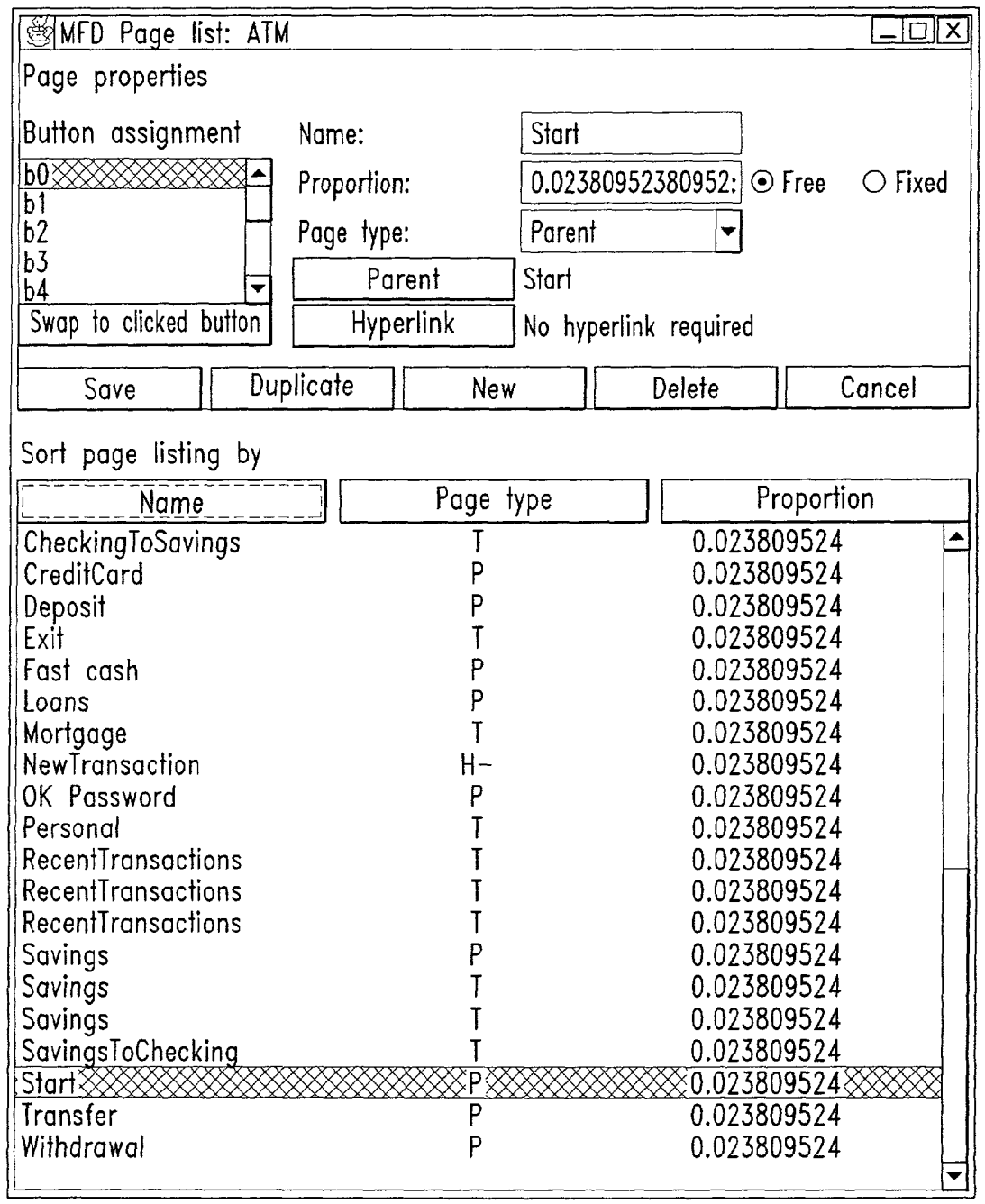
FIG. 17 depicts the MFD Page List window as it appears after opening the file ATM.hdw.

The selection of pages from the MFD Hardware or MFD Hierarchy windows is also yoked to a third display of MFD page names in the MFD Page list window. FIG. 17 shows this window after the file ATM.hdw is loaded. All forty-two pages in the ATM hierarchy are listed on the bottom of the MFD Page list window. Each page has its name and its type: Parent (P), Terminator (T) or Hyperlink (H). In addition, a hyperlink page has an added "–" to indicate that it needs to have its hyperlink target set by the designer. Selecting a page from this list updates the MFD Hardware and MFD Hierarchy windows to display that page (or that page's parent, if the selected page is a terminator or a hyperlink). Each page listed also has a number, p=0.023809524, which indicates the default proportion of times that this page will be needed by the user. These proportions are relative to the currently selected interaction (describe below). MFDTool's default is to assume that every page is needed equally often, so this number is one over the number of pages in the hierarchy, $\frac{1}{42}$. These proportions can be set by the designer, as described below.

Figure 18:
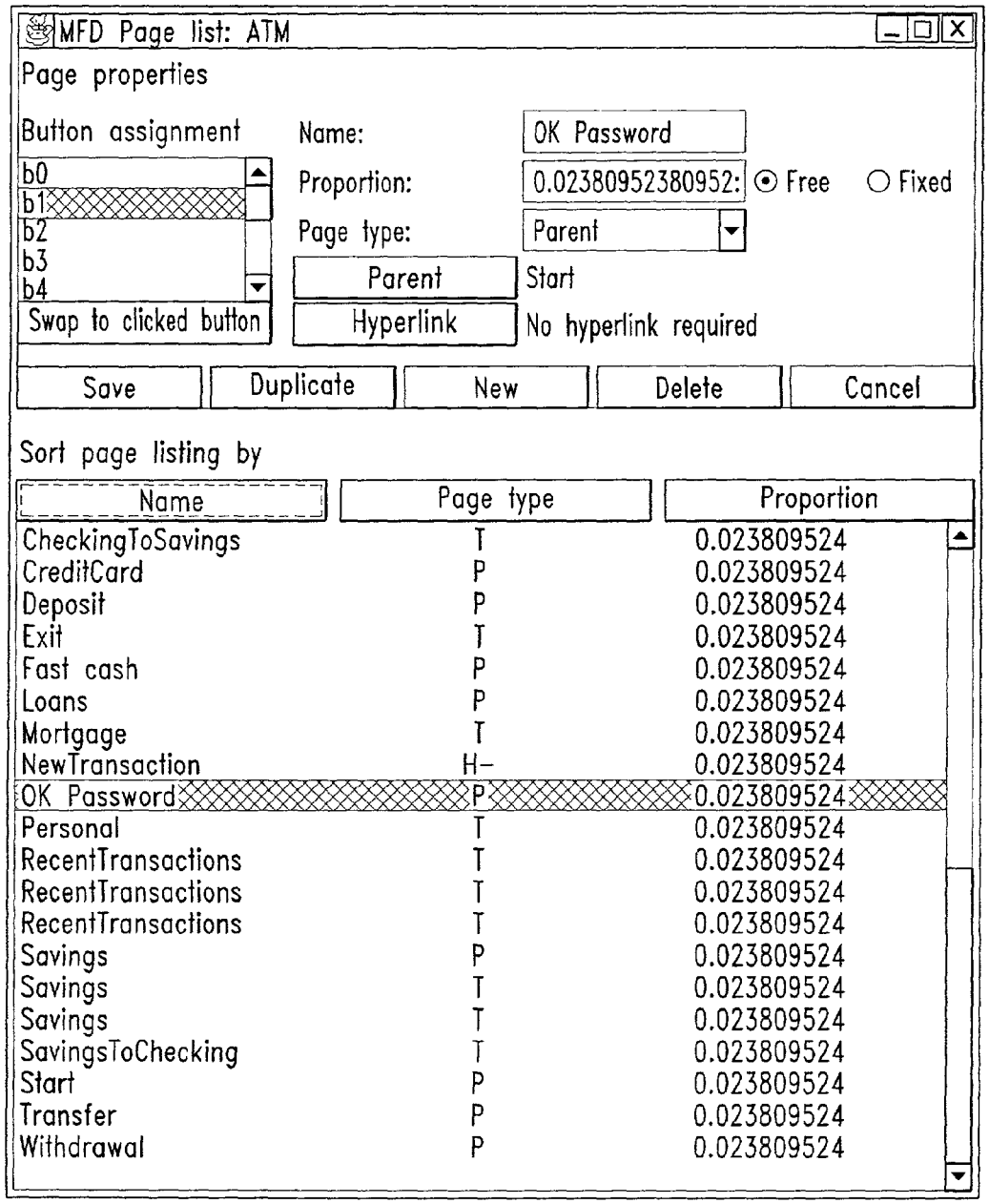
FIG. 18 shows the MFD Page list window as it appears after selecting the page name OK Password.

The yellow area at the top of the MFD Page list window contains information about the currently selected page. In FIG. 17, the selected page is the Start page, which corresponds to the very top of the MFD hierarchy. From left to right in the MFD Page list window, one finds the following information. This label is associated with button b0, as indicated in the list of "Button assignment." The name of the label is "Start". Its proportion is the default 0.023809524; and the checkboxes to the right of the proportion text field indicate that this proportion is "free". This indicates that as other pages change their proportion to be a "fixed" amount set by the designer, the proportion for this page will adjust accordingly. The page type is "Parent." The parent of this page is itself; which is only going to be the case for the very top page of the hierarchy. No hyperlink is required because this page is not a hyperlink. FIG. 18 shows that the information is updated when the OK Password page is selected.

4.2 Editing an MFD Hierarchy

It is generally easier to take a pre-existing MFD hierarchy and modify it to be as you wish than to build one from scratch as described above. MFDTool provides a number of tools to modify, add, delete, move, and duplicate MFD pages. All of these capabilities are provided on the MFD Page list window.

In the examples below, the names given to MFD hardware buttons were first modified (as described above) to be more descriptive of their relative locations.

4.2.1 Setting Hyperlinks

A hyperlink page contains a shortcut to a different part of the MFD hierarchy. Selecting a properly defined hyperlink in the MFD Hardware window makes the hyperlink target page the currently selected page and displays that page (or its parent if the target is a terminator). When the directory structure that defines the MFD hierarchy is loaded into MFDTool, there is no way to identify the targets of hyperlink pages. The designer must define the hyperlinks within MFDTool. This is done from the MFD Page list window.

Figure 19:
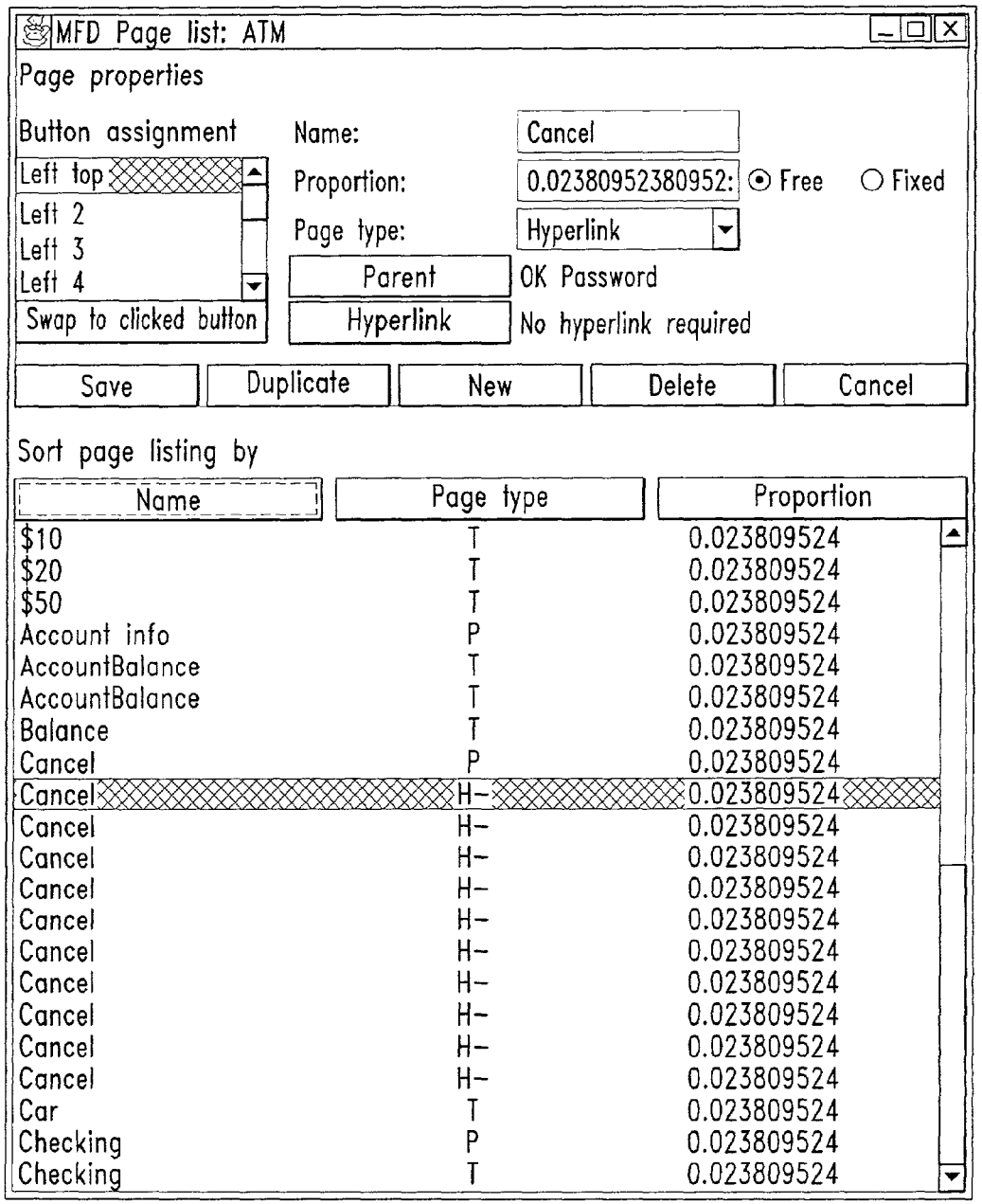
FIG. 19 illustrates the MFD page list window as it appears after selecting the page Cancel.

Hyperlinks that have not had their target defined are shown in the page listing on the MFDTool window with type "H-". If a hyperlink is selected from this list (or from the MFD Hierarchy window), the top part of the MFD Page list window displays information on the page. From the MFD Page list window, select the first Cancel hyperlink page. The window should look like in FIG. 19. To set the hyperlink, click on the Hyperlink button. The button will change its label to read Set hyperlink and the text to the right will read "Select a hyperlink target." This enters the MFD Page list screen into a mode where selecting an MFD page (through the MFD Page list, MFD Hardware, or MFD Hierarchy window) makes it a possible hyperlink target for the edited page. In this mode, the name of the selected page appears to the right of the Set hyperlink button. Select the Cancel parent page as the desired hyperlink target, then click on the Set hyperlink button; this defines the currently selected page as the new hyperlink target.

Now click on the Save button, which updates the Cancel hyperlink originally selected. To verify that it has worked properly, open the MFD Hierarchy window and click the Show parent page until you reach the top of the hierarchy. Now open the MFD Hardware window and click on the OK Password button and then the Cancel button. The MFD Hardware window should now display the Cancel page, which contains two labels: Exit and NewTransaction.

You can set the other Cancel hyperlinks in the same way (they should all target the Cancel page). You should also set the hyperlink for page NewTransaction to target the OK Password page. When all this is done, all the hyperlink page types in the MFD Page list will be H instead of H−. Hyperlink targets can be changed at any time.

4.2.2 Modifying Page Name

Select a page from the MFD Page list, MFD Hardware, or MFD Hierarchy window. The page's name appears in the Name text field. This text field is editable. Simply type in the new name and then click on the Save button. The page label is automatically updated throughout MFDTool (including all constraints, as described below).

4.2.3 Modifying Page Button Assignment

Each page label is assigned to a particular button on the MFD Hardware window. Figuring out the proper assignment is the primary purpose of MFDTool. However, a designer may wish to make the assignment by hand from time to time.

Select a page from the MFD Page list, MFD Hardware, or MFD Hierarchy window. The page's button assignment is highlighted in the "Button assignment" list. For example, if the page $10 is selected, the button titled Left 2 is highlighted. An alternative assignment can be selected in two ways. Either select a different button name from the "Button assignment" list, or click on the Swap to clicked button button and then click on a button on the MFD Hardware window. In either case, then click on the Save button to save the button assignment for the selected page.

If another page label is already associated with the newly selected button, the pages will swap button assignments.

4.2.4 Moving a Page in the Hierarchy

The hierarchical arrangement of information is established by the definition of a page's parent. Changing the parent of a page redefines the hierarchical arrangement of information.

Select a page from the MFD Page list, MFD Hardware, or MFD Hierarchy window. The name of the parent of this page is given to the right of the Parent button. Clicking on the Parent button initiates a mode much like that for the definition of hyperlinks.

For example, select the CreditCard page. The name of the parent of this page is Account info. Suppose you wanted credit card information to be located on the OK Password page, which also lists labels for Checking, Savings, Fast cash, and Account info. This is done by setting the parent of the CreditCard page. Click on the Parent button, it will be relabeled Set parent and the text to the right of the button will read "Select a parent page." Click on the OK Password label (or choose it from the MFD Hardware or MFD Hierarchy window). Click on the Set parent button. Click on the Save button.

You can verify that the CreditCard page has moved by looking at the MFD Hardware or MFD Hierarchy window. Movement of the CreditCard page includes movement of any children of that page. The button assignment for a moved page is unchanged, unless another page is already assigned to that button. In the latter case, the moved page is assigned to the first available button. If there are no available buttons under the new parent page, the move will not occur.

4.2.5 Deleting a Page

Select a page from the MFD Page list, MFD Hardware, or MFD Hierarchy window. Clicking on the Delete button removes that page from the MFD hierarchy. If the page is a parent and there are any children under the page, they are also deleted. The only page that cannot be deleted is the very top page of the MFD hierarchy.

If a deleted page is targeted by a hyperlink page, that hyperlink becomes broken and is indicated with a page type of H−. If a deleted page was part of a constraint, the page is automatically removed from that constraint. If the deleted page was part of a Path difficulty constraint, the designer will probably want to redefine that constraint.

Be careful with the delete option because there is no undelete option.

4.2.6 Creating a New Page

Select a page from the MFD Page list, MFD Hardware, or MFD Hierarchy window. Set whatever properties of a new page you wish (e.g., name, page type, button assignment, parent). Clicking on the New button creates a new page that has the specified properties.

If the new page is assigned to a parent that already has as many children as buttons, the new page is not created. If the new page is given a button assignment that is already being used by another page, the new page will be assigned to the first available button.

4.2.7 Duplicating a Page

Duplicating a parent page (duplication is not an option for terminators or hyperlinks but they can be easily duplicated with the new page creation) copies not only a selected page but also any other pages that are hierarchically underneath that page. Select a parent page from the MFD Page list, MFD Hardware, or MFD Hierarchy window and then click on the Duplicate button. A new page will be created with a name that is the same as the selected page, but with a lead in of "Copy of". The new page will have the same parent as the originally selected page.

If the parent of the selected page already has as many children as there are buttons, then there will be no room for the newly created page. In such a case the duplication does not occur. If the duplication succeeds, the new page is assigned to the first available button. All the newly created children keep the same properties as their original corresponding pages.

4.2.8 Setting Proportions

Proportion indicates how often this page will be accessed by the user, for the currently selected interaction (described below). The default situation assumes that each page will be requested equally often, so with the 42 pages in the MFD, each page has a proportion of 1 over 42, or $p=0.023809524$. However, typically some pages are used more often than others, and a Global difficulty constraint uses these differences to identify how to assign labels to buttons.

For example, the Start page is the top of the hierarchy. It is not a page that is ever directly accessed by the user, thus the designer could set its $p=0$. This is done by selecting the Start page and then replacing its proportion with 0.0 in the Proportion text field. Before saving this information, click on the Fixed radio button. A Fixed proportion is not modified by the proportions of other pages. A Free proportion adjusts automatically as other pages change their proportions. After setting the Start proportion as fixed, click on the save button. In addition to setting the Start page proportion to zero, the proportions of other pages (all free) are changed to $p=0.024390243$, or 1 over 41. Thus, the sum of all proportions equals 1.0.

Proportions only influence a Global difficulty constraint, so there is no reason to define proportions unless this constraint is being used. If multiple interactions are defined and Global difficulty is a constraint for each interaction, the proportions will need to be defined separately for each interaction.

5 MFD Interactions

Figure 20:
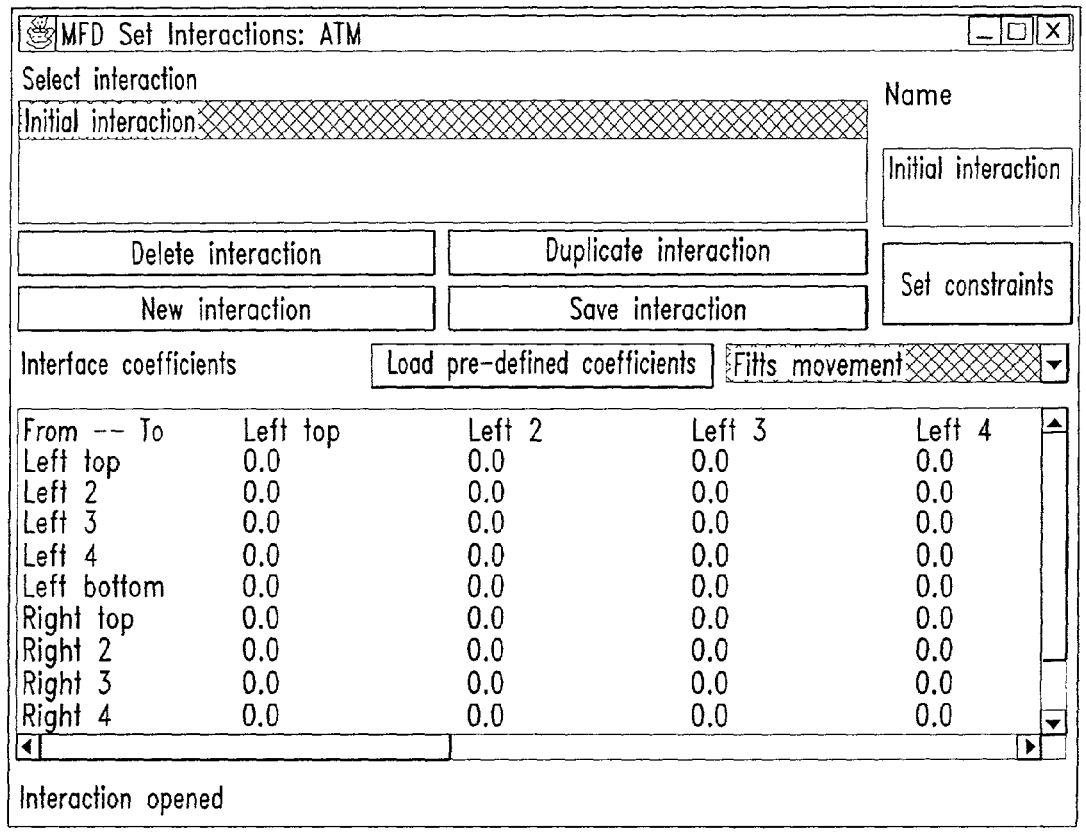
FIG. 20 depicts the MFD Set Interactions window as it appears after selecting the Initial interaction.

From the MFDTool window, click on the Interactions button. A window titled MFD Set Interactions: ATM will appear. Select the sole item in the list box on the upper left (titled "Initial interaction") and the window will look like that in FIG. 20.

The text box at the bottom of the window provides a matrix description of the interaction's coefficients. Each interaction coefficient is a real number that defines a relationship (often distance of some sort) between a pair of buttons. The top row and left-most column are the button names. The numbers then indicate the coefficient for a relationship from the button in a row to the button in the column. It is not necessary for inter-action coefficients to be symmetric (that is the coefficient from Left top to Left 2 need not be the same as the coefficient from Left 2 to Left top).

By default, a new interaction has coefficients of zero. The designer can edit the coefficients by simply changing the 0.0 numbers to whatever is desired. The description of a coefficient is simply text, so the designer may also import calculations of coefficients from other programs, as long as they are in the format required by MFDTool. The format is that each "cell" is separated by a tab, and there must be an item in every cell. This format is consistent with copying and pasting from many spreadsheet programs. The top row and left column cells are not read (but there must be something in those cells). All other cells must be numbers. The status line at the bottom of the MFDSet Interactions window will identify the location and type of the first found error (if any) as it tries to parse the textual information.

MFDTool also provides mechanisms for computing a number of useful interaction coefficients. The choices are in the pull-down options just above the coefficient matrix box. To set the coefficients to be any of these, select the desired set of coefficients and then click on the Load pre-defined coefficients button. The coefficients matrix text box will immediately fill in with corresponding numbers. For example, FIG. 21 shows the MFD Set Interactions window after loading coefficients that correspond to Euclidian distance. To save these interaction coefficients, click on the Save interaction button.

With the exception of the Set constraints button, the other parts of the MFD Set Interactions window are fairly straight forward. The name of the currently selected inter-action can be changed in the Name text field. A new interaction can be created by clicking on the New interaction button. An interaction can be deleted with the Delete interaction button (but there must always be at least one interaction). An interaction and all of its properties (including constraints) can be duplicated with the Duplicate interaction button.

5.1 Setting Constraints

Figure 22:
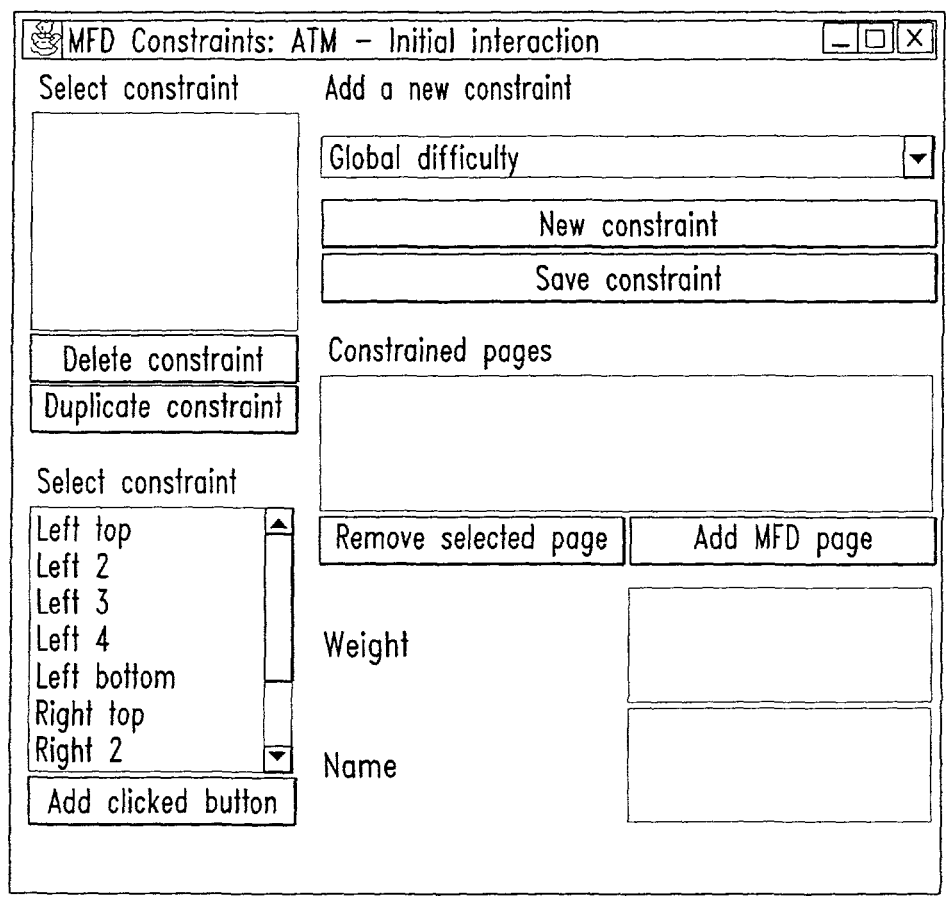
FIG. 22 illustrates the ATM—Initial interaction window when it first appears.

After an interaction is created a designer can define constraints relative to that interaction. Select the desired interaction by clicking on its name in the list on the MFD Set Interactions window. Then click on the Set constraints button. A new window will appear that looks like FIG. 22. The title of the window identifies both the name of the MFD and the name of the selected interaction.

Constraints are defined in the MFD Constraints window, with the MFD Hierarchy, MFD Hardware, and MFD Page list windows being optionally used to select various MFD pages for constraining.

The creation of a constraint begins by selecting the type of constraint that is desired. This is done with the menu choice option on the right side of the MFD Constraints window. After the type of constraint is selected, click on the New constraint button. What to do next depends on the type of constraint selected, as discussed below.

5.1.1 Global Difficulty

Figure 23:
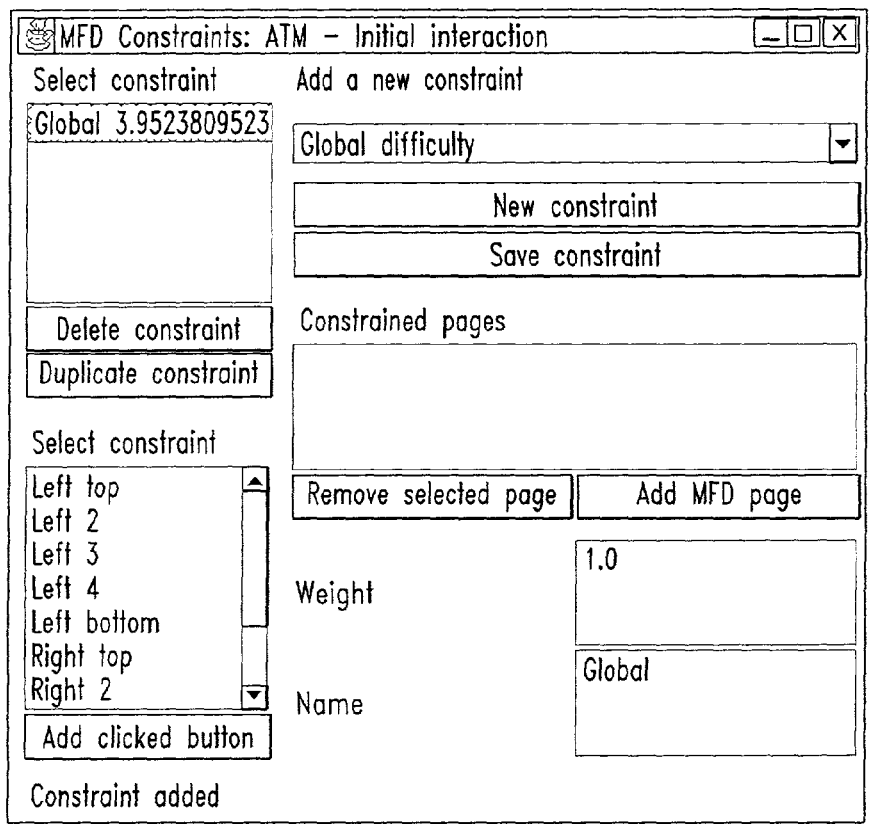
FIG. 23 depicts the MFDTool window as it appears after creating and saving the constraint Global.

This constraint acts to minimize the average sum of interaction coefficients as the user goes through the button presses that traverse the hierarchy to access different MFD pages. The designer has the option of providing a name for this constraint (the default is C#, where # is the number of constraints currently defined). The name is listed in the text field on the bottom right of the MFD Constraints window. The designer also has the option of setting the weight for this constraint in the text field directly above the name text field; the default is 1.0. Once the name and weight are as desired, click on the Save constraint button. The list box on the left side of the MFD Constraints window now shows the name of the just saved constraint. FIG. 23 shows what the MFD Constraints window looks like after the constraint is created and saved. There is no reason to include more than one Global difficulty constraint for an interaction.

In the list of constraints, the number to the right of the constraint name gives the cost of the current mapping of MFD labels to buttons. From the listing of constraints, selecting a constraint loads the selected constraint's properties into the appropriate constraint fields. These can then be edited and clicking on the Save constraint button updates the constraint. The Delete constraint button deletes the currently selected constraint. The Duplicate constraint button makes a copy of the currently selected constraint.

The optimization on this constraint considers the proportion of time each page is needed. The page proportions can be set at any time (e.g., before or after defining the constraint) on the MFD Page list window, as described above.

The set of constrained pages is the entire MFD hierarchy by default. Selecting the Global constraint will provide a listing of all MFD pages in the Constrained pages list box on the middle right of the MFD Constraints window. You can remove a page from this list or add a page to this list. Adding a page is done by selecting an MFD page from the MFD Page list, MFD Hardware, or MFD Hierarchy window and then clicking on the Add MFD page button in the MFD Constraints window. If the MFD page has already been assigned to this constraint, the status line at the bottom of the MFD Constraints window will indicate as much.

5.1.2 Pages to Close Buttons

Figure 24:
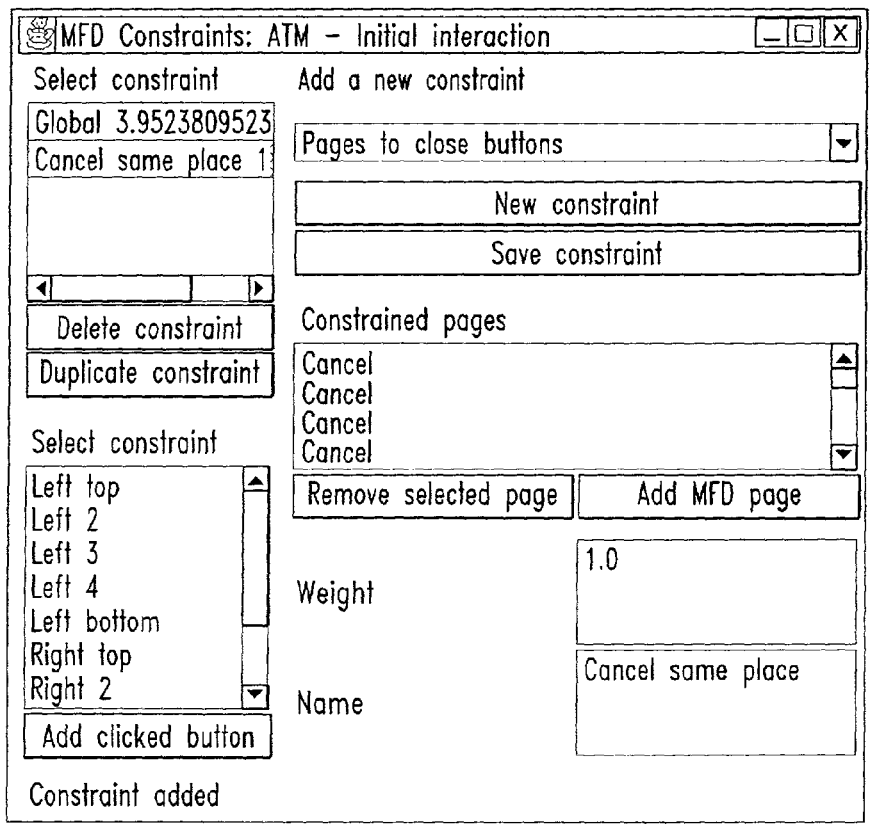
FIG. 24 shows the MFD Constraint window as it appears after creating and saving the constraint Cancel same place.

This constraint has two main purposes. The first is to place specified labels on the same MFD screen as close together as possible. The second is to place specified labels on different MFD screens as close together as possible. "Closer" is defined as a smaller interaction coefficient. To create this type of constraint, select Pages to close buttons from the menu choice on the right side of the MFD Constraints window and then click on the New constraint button. Set the name and weight as desired. Assign selected pages, as described above. FIG. 24 shows what the MFD Constraints window looks like after all the pages with the name Cancel are constrained to be close to each other.

5.1.3 Pages to Far Buttons

This constraint is the complement of the previous one. It may be useful if a designer wants to insure that certain buttons are very separate; perhaps to avoid confusion by a user, or to avoid the risk of error.

Setting up the constraint is essentially the same as for the Pages to close buttons constraint.

5.1.4 Pages to Fixed Buttons

This constraint allows the designer to restrict specified page labels to specified buttons. To create this type of constraint, select Pages to fixed buttons from the menu choice on the right side of the MFD Constraints window and click on the New constraint button. Set the name and weight of the constraint as desired. Assign selected pages as for the Pages to close buttons constraint, above. In addition, from the list of Select buttons, click on the names associated with the buttons you want the pages to be restricted to. An alternative means of selecting a button is to click on the desired button in the MFD Hardware window and then click on the Add clicked button in the MFD Constraints window. This will automatically select the just clicked button.

Figure 25:
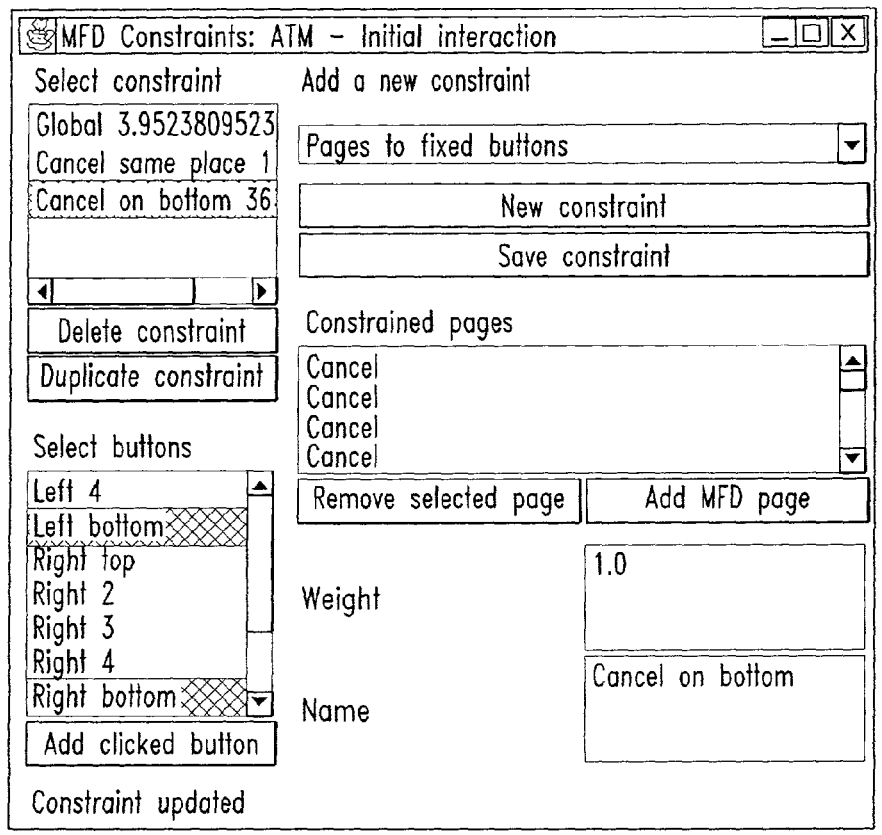
FIG. 25 illustrates the MFD Constraints window as it appears after creating and saving the constraint Cancel on bottom.

FIG. 25 shows the MFD Constraints window after the designer has introduced a constraint to place the Cancel labels to be on either of the two bottom buttons. Notice that in combination with the constraint to place all the Cancel labels on close buttons, the optimized MFD design should put all the Cancel labels on either the bottom right or the bottom left button.

5.1.5 Path Difficulty

This constraint applies to a designer-defined special sequence.

To create a path difficulty constraint, select Path difficulty from the menu choice on the right side of the MFD Constraints window, then click on the New constraint button. Set the name and weight of the constraint as desired. The designer now needs to assign pages to the constraint in the same order that the user will travel through the pages along the "special path." Select the first page along the path, and click on the Add MFD Page button. For each subsequent page along the path, select that page and click on the Add MFD Page button. The order that the pages are added to the constraint is the order that MFDTool will assume the user will move through the hierarchy.

Once the path is defined, click on the Save constraint button. FIG. 26 shows the MFD Constraint window after saving a short Path difficulty constraint.

5.1.6 Parent to Child Variability

This constraint differs in many respects from the other constraints. Those constraints minimize (or maximize) some function of the interaction coefficients. This constraint minimizes variability among the interaction coefficients for the buttons from a parent to a child. The designer specifies the child pages.

Figure 27:
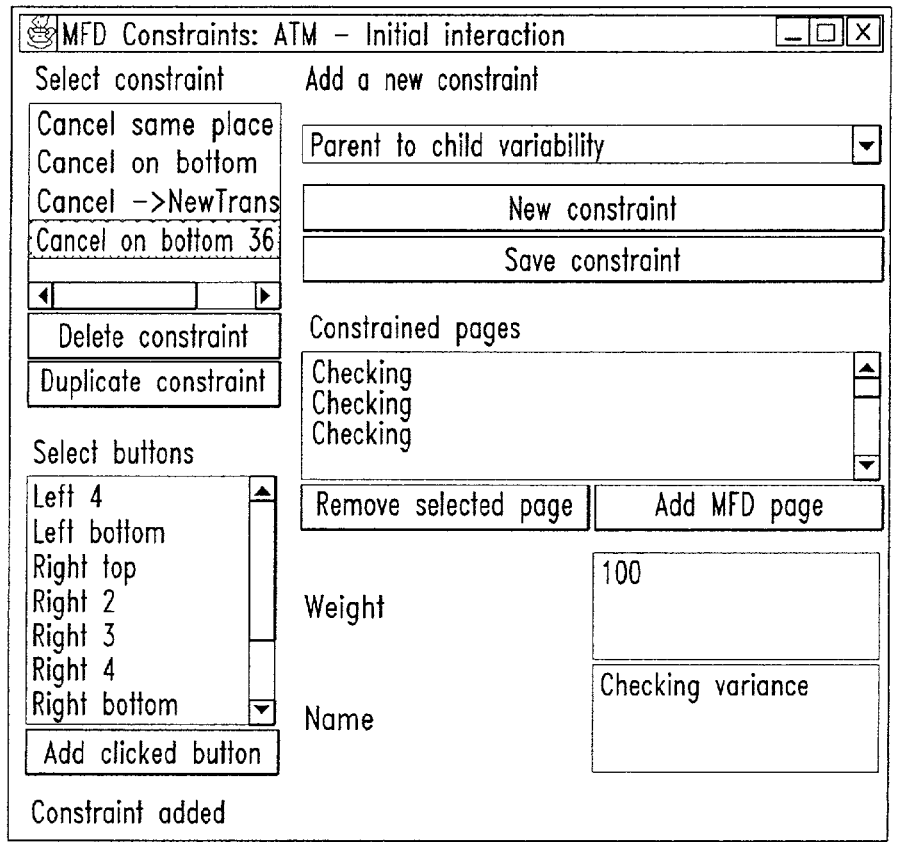
FIG. 27 shows the MFD Constraints window as it appears after creating and saving the constraint Checking variance.

For example, perhaps a designer wants each Checking label to be in the same position relative to its parent's label button. To create such a constraint, select Parent to child variance from the menu choice on the right side of the MFD Constraints window, then click on the New constraint button. Add the desired pages to the Constrained pages list (in this case, each page named "Checking"). Set the name and weight as desired, and then click on the Save constraint button. FIG. 27 shows the MFD Constraints window as it appears after creating and saving the constraint Checking variance.

With the current Euclidian distance interaction, MFDTool will act to place each Checking label on a button at the same distance from its parent's button.

6 Optimization

Figure 28:
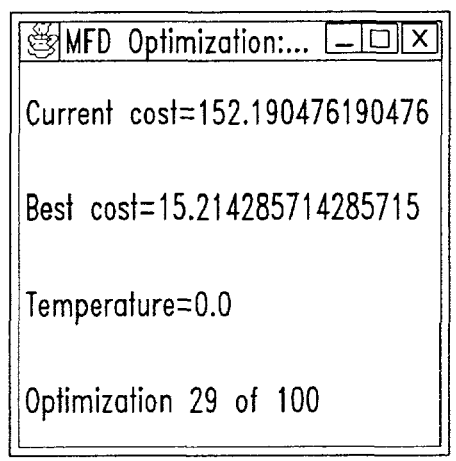
FIG. 28 illustrates the MFD Optimization window as it appears while running an optimization.

Once all the desired constraints are set, the designer can start the optimization process. Simply click on the Start optimization button on the MFDTool window. A new window will appear that looks like FIG. 28.

Depending on your computer, the size of the hierarchy, and the complexity of the constraints, the optimization process may take a few minutes to several hours.

There is no way to adequately describe the effect of optimization in written text. A previously optimized design is included with MFDTool. Start MFDTool and go to File! Open. From the open file window, select the directory Examples and then the file ATM1.mfd. Clicking through the MFD Hardware will give a good idea of the assignment of page labels to buttons.

Figure 29:
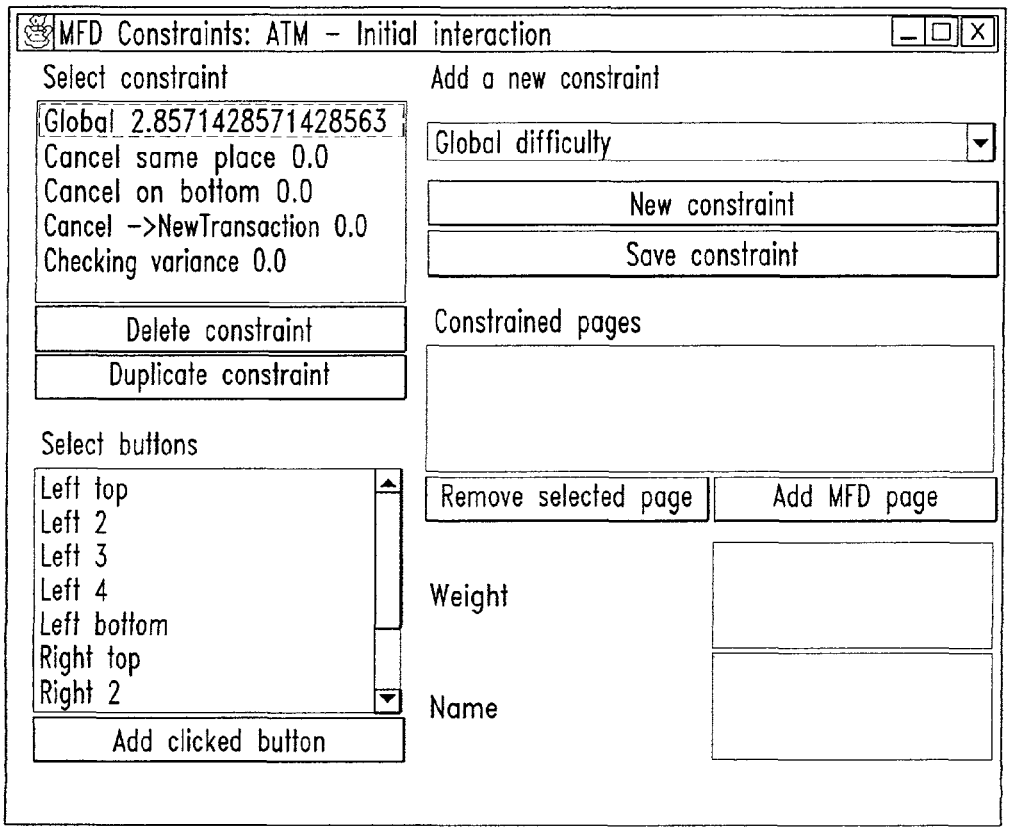
FIG. 29 depicts the MFD Constraints window as it appears after the optimization.

The optimization is, of course, relative to the defined constraints. For this file, the constraints were as described in the discussion of constraints above. FIG. 29 shows the MFD Constraints window for the optimized design. Note that the costs for the different constraints are zero, except for the Global constraint. This means that all but the Global constraint are perfectly satisfied.

The resulting design deals with a number of subtle issues with regard to these constraints. For example, the OK Password page is on the middle left button. After selecting the OK Passwords page note that Account info is on the very same button. This is the best assignment, rather than placing some other page on that button because Account info is a parent page that contains many children underneath it. In terms of overall probability of access, the user will go through the Account info page more often than any other page. Thus, the interaction coefficients will be minimized by putting Account info on the same button as the OK Password page.

Notice that on each page, the labels tend to be clustered around the same button as was used to access the page. This minimizes the interaction coefficients.

Notice that the Cancel pages are all on the same button and on a bottom button.

Notice that the NewTransaction label is on the same button as the Cancel labels. This satisfies the Cancel→NewTransaction constraint.

Notice that a Checking label is always located on a button that is one above or one below the button that was used to get to the page containing that label. This minimizes the parent to child variance among these labels.

In short, once the MFD hardware, hierarchy, and constraints are defined, the optimization is handled by the computer. The optimization is exceedingly thorough, and considers many details that a human designer will likely not have the time to deal with. Naturally, the design should still be validated by the human, as it is possible that the selected constraints do not correctly identify the important aspects of the design problem. It is also quite possible that the optimization process does not find the absolute best design, but only a pretty good design. Occasionally, a designer can look at the "optimized" design and recognize a better variation of what MFDTool provides. Alternative designs can be explored with the manual setting of button assignments.

6.1 Setting Optimization Parameters

Figure 30:
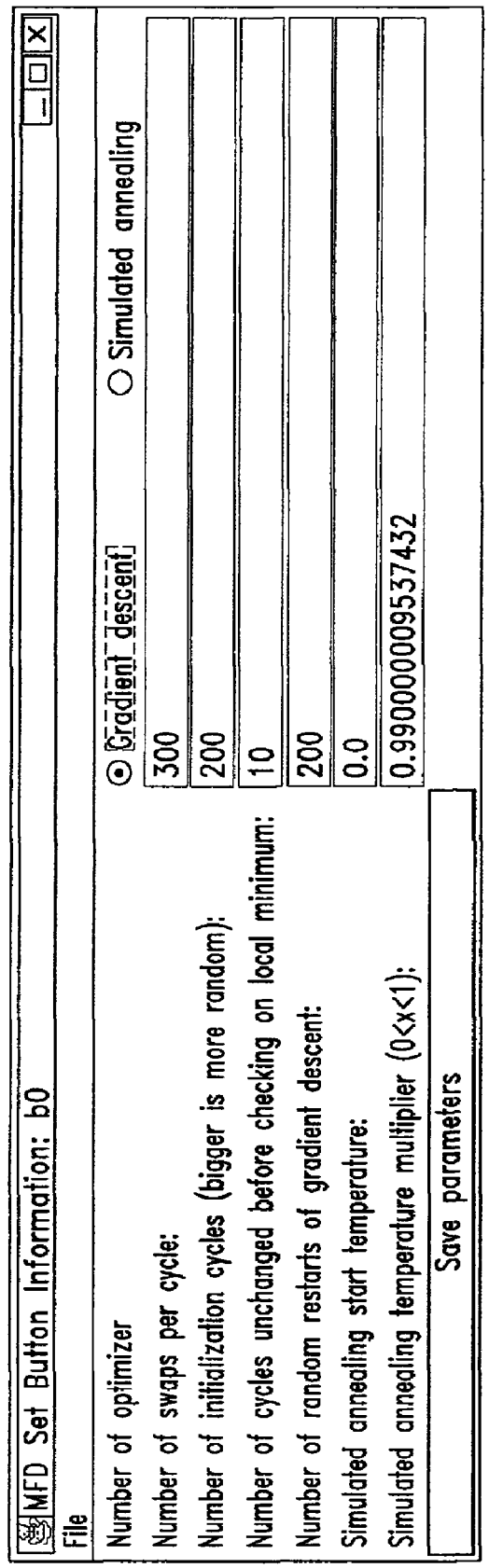
FIG. 30 shows the MFD Set optimizer window.

MFDTool optimization starts with a default set of optimization parameters, but a designer can surely do better by setting things appropriately. These parameters can be set by clicking on the Set optimizer button from the MFDTool window. FIG. 30 shows what this window looks like.

MFDTool can use either of two types of optimization techniques. The appropriate parameters to set are described below.

6.1.1 Gradient Descent

Number of swaps per cycle: A cycle is a set of random changes of page button assignments. This parameter establishes the number of changes in a given cycle.

Number of initialization cycles: At the start of each optimization run, MFDTool randomizes the assignment of pages to buttons. This parameter sets how many cycles of random changes are made to define the random initialization state.

Bigger numbers mean the random initial state is more random, which is generally better when searching for an alternative to a design that was just found.

Number of cycles unchanged before checking on local minimum: When it seems that the optimization has finished, MFDTool checks to verify that there is no single change in button assignments that would produce a lower cost. MFDTool decides that it should check for a local minimum when a specified number of cycles has not produced any changes in cost. Setting this number very low likely means that MFDTool will often check before it should. Setting this number very high likely means that MFDTool will continue making random changes that cannot possibly improve the optimization. The terms "very low" and "very high" can only be defined relative to a specific optimization problem.

Number of random restarts of gradient descent: Gradient descent is a fast optimization technique, but it often fails to find a global minimum of a cost function. To overcome this limitation, MFDTool can repeat the optimization from many different (randomly generated) initial states. This parameter sets how many times the optimization should be repeated. MFDTool keeps the best design from all of these optimizations.

Simulated annealing start temperature: This parameter is not used by the gradient descent technique. Any value here will be ignored.

Simulated annealing temperature multiplier: This parameter is not used by the gradient descent technique. Any value here will be ignored.

6.1.2 Simulated Annealing

Number of swaps per cycle: A cycle is a set of random changes of page button assignments. This parameter establishes the number of changes in a given cycle. The simulated annealing temperature is fixed during one cycle.

Number of initialization cycles: At the start of each optimization run, MFDTool randomizes the assignment of pages to buttons. This parameter sets how many cycles of random changes are made to define the random initialization state. Bigger numbers mean the random initial state is more random, which is generally better when searching for an alternative to a design that was just found.

Number of cycles unchanged before checking on local minimum: When it seems that the optimization has finished, MFDTool checks to verify that there is no single change in button assignments that would produce a lower cost. MFDTool decides that it should check for a local minimum when a specified number of cycles has not produced any changes in cost. Setting this number very low likely means that MFDTool will often check before it should. Setting this number very high likely means that MFDTool will continue making random changes that cannot possibly improve the optimization. The terms "very low" and "very high" can only be defined relative to a specific optimization problem.

Number of random restarts of gradient descent: This parameter is not used by the simulated annealing technique. Any value here will be ignored.

Simulated annealing start temperature: The start temperature needs to be large enough to allow lots of increases in cost to be accepted by the simulated annealing optimizer during the early stages of the process. Setting this number bigger generally makes the optimization better (to a limit), but it also increases the time required for the optimization to finish.

Simulated annealing temperature multiplier: After each cycle, the simulated annealing temperature is multiplied by this number. Simulated annealing works by gradually reducing the temperature, and this parameter defines what "gradually" means. Setting this number closer to 1.0 generally makes the optimization better (to a limit), but it also increases the time required for the optimization to finish. Because of its random nature, the simulated annealing may sometimes find a final design that is not as good as one of the designs it found during its random changes. MFDTool always keeps the absolutely best found design and reports that as the best design of the optimization.

6.2 Saving Optimizers

It sometimes takes quite a bit of tweaking to find a set of optimization parameters that work efficiently with a given MFD design problem. A designer may wish to re-use the optimizer parameters from one MFD task for another MFD task. With this in mind, MFDTool allows the designer to save the parameters of a created optimizer and to load those parameters for another MFD design task. This can be done through the File pull-down menu on the MFD Set Optimizer window.

7 Examples

This section describes several ATM designs that are optimized relative to different types of interactions and constraints. All of the MFD files are in the folder Examples and are accessed through the MFDTool window.

Realize that none of these examples are meant to necessarily indicate good MFD designs. They are included here to demonstrate how the different constraints and interactions are interpreted by the optimization process. The resulting MFD is only a good design if the interactions and constraints accurately capture the important issues in the use of the MFD.

7.1 Fitts Law: ATMFitts1.mfd

This MFD design highlights the use of Fitts law for defining interaction coefficients. To that end, the corner buttons are set to have much larger Fitts sizes than their actual sizes. This should make movements toward the corner buttons much faster than movement to any other buttons.

In addition, page proportions were set so that page $20 under Fast cash has a proportion of p=0.2, thereby indicating that it is frequently used.

Predictably, the optimized design tends to place labels on the corner buttons. The only exceptions are for when a parent label is not on a corner button, in which case it is faster still to put the label on the same button as the parent.

7.2 Fitts Law: ATMFitts2.mfd

This design is a variation of the previous one, with the assumption that the Fitts sizes of the corner buttons are actually the same as their physical size. Notice the dramatic change in the overall design.

7.3 Fitts Law with Consistency: ATMFitts3.mfd

This design is a variation of the previous one, but includes an additional interaction, Euclidean distance, that is used to keep sets of pages with a common name on the same buttons.

The optimized design satisfies all the Euclidean distance constraints, and then minimizes the Fitt's law constraints as best as possible.

7.4 Fitts Law with Relative Consistency: ATMFitts4.mfd

This design is a variation of the previous one, but instead of requiring that all the Cancel pages be on the bottom and at the same buttons, it requires that they have a minimization of parent to child variance. This means that on each page, the Cancel label should be in a particular position relative to the button that was pressed to reach that page.

This restriction is imposed with the definition of two additional interactions: X-directed and Y-directed. For each of these interactions, all the Cancel labels are constrained to be placed on buttons that have the same interaction coefficient from their parent page button.

The optimized design is substantially different from the earlier designs. From a visual standpoint it may seem poor design to place the Cancel label on different buttons for different pages. However, this constraint imposes a commonality of movement to reach the Cancel button. Upon access of any MFD page, the user would move up one button to reach the Cancel button. In some situations, this consistency of movement may be a more important consistency than physical location.

7.5 Fitts Law with Relative Consistency and Order: ATMFitts5.mfd

This design is a variation of the previous one, but it now addresses a potential conflict between the consistency and visual grouping of labels. In the previous design, the list of labels on the Fast cash page are scattered. This allows the Cancel button to be located one button above the Fast cash button. However, the cost in terms of visual arrangement of the monetary labels may be detrimental.

To address this issue, two new constraints are added to the Euclidean distance interaction. These constraints require the labels $10 and $20 to be next to each other and the labels $20 and $50 to be next to each other. The upshot of these constraints is that the labels $10, $20, and $50 need to be in an order (either ascending or descending) for these constraints to be minimized.

Satisfying these constraints leads to an optimized design that is substantially different. It tends to meet these constraints at a cost to the Global constraint in the Fitts interaction (which has a smaller weight). In ATMFitts5.mfd the cost for the Global constraint is 447.06, while for the design in ATMFitts2.mfd the cost is 339.88. The difference for the former is that additional constraints are imposed, and the optimization trades off one cost for another.

7.6 Tabbing: ATMTabbing1.mfd

This design is a variation of the one in ATMFitts3.mfd. It replaces the Fitts movement interaction with one that specifies movement based on tabbing between buttons with arrow keys. In the Tabbing interaction it is assumed that an up arrow press at a top button loops down to the bottom button on the column. Likewise, a down arrow press at a bottom button loops up to the top button on the column.

7.7 Fitts Law and Tabbing: ATMTabbing2.mfd

This design includes a Global constraint for both a Fitts Law interaction and a Tabbing interaction. This could be useful if there are two types of possible interactions and the MFD needs to be designed for use by either one. Or, this could be a case where two different users must access the same MFD system, but will have different interfaces (e.g., pilot and copilot). Because the interaction coefficients for Fitts Law are numerically larger than those for the Tabbing interaction, the weights on the Tabbing constraints were increased.

7.8 Fitts Law and Button Occlusion: ATMOcclusion1.mfd

This design is a variation of the one in ATMFitts3.mfd. It modifies the Fitts movement interaction to consider the possibility that when a user has their finger over a button that many button labels are occluded. If the user must read the button labels to know where to move next (e.g., the user is not highly practiced and does not have the button assignments memorized), then the user may need to move their hand out of the way before making a movement to a desired button. This extra movement will take time, which is assumed to be a constant 1500 milliseconds for any time the occlusion makes a difference. (Note, these interaction coefficients are not making any assumption about how long it takes to actually read the labels, they simply assume that the movement time involved in moving the hand away from the screen and then moving it to the correct button is a constant 1500 milliseconds.)

The resulting design is quite interesting. MFDTool assigns labels to buttons to avoid possible occlusion. Although visually unappealing, in terms of use, this could be a very practical design.

7.9 Fitaly: Fitaly.mfd

This example shows an entirely different type of MFD, part of a keypad entry system for a Palm Pilot hand-held computer. Because a Palm Pilot is usually used with one finger (or a pen) instead of the ten finger technique used on typewriter keyboards, there is reason to expect that a new layout of keys can make for faster entry of information. The Fitaly keyboard was designed by Textware Solutions (http://www.twsolutions.com). The engineers at Textware Solutions based their design on consideration of the frequency of using individual letters and the frequency of letter-to-letter transitions. The former frequencies are published on their web site, and were used to create an analogous design in MFDTool. Interestingly, MFDTool creates a design quite similar to the Fitaly design. In particular, the six letters in the middle three rows of the middle two columns are the same in both designs. These correspond to the most frequently used letters.

The discrepancies between the two designs probably correspond to the effect of letter-to-letter transitions, which the current MFDTool example does not consider (but could be implemented with multiple Path difficulty constraints). Without consideration of those transitions, the MFDTool design is slightly more optimized relative to a Fitt's Law interaction. The MFDTool design has a global constraint cost of 182.77, while the Fitaly design has a global constraint cost of 185.85 (see the file origFitaly.mfd).

7.10 Alternatives to Fitaly: Fitaly2.mfd, Fitaly3.mfd, and Fitaly4.mfd

MFDTool can also be used to consider optimization of other hardware designs. For example, in Fitaly2.mfd the two space buttons are merged into a single large button and placed slightly off the center of the screen, the optimized assignment has a larger average Fitt's movement time (184.28) than the optimized layout for the hardware used by the original Fitaly system.

If the space buttons are merged and placed on the lower left as in Fitaly3.mfd, the optimized design produces a global constraint cost of 181.35. This is a difference of 1.5 milliseconds faster than the optimal design with the original Fitaly hardware configuration. It is 4.5 milliseconds faster than the Fitaly layout. A 4.5 millisecond difference is small, but it accumulates over extended use. MFDTool also identifies where the "home" for the user should be by assignment of the Start page to a button (row three, column 3; the e button).

Even better results are found for the design in Fitaly4.mfd, where the space button is one row high and four columns long and placed on the middle bottom of the display. The Fitt's Law interaction's global constraint for the optimized design is 167.61 milliseconds, which is 13.74 milliseconds faster than any other design discussed so far. Relative to the original Fitaly layout, this design has an 18.24 millisecond advantage.

Of course, these alternatives to the original Fitaly design may not be as good as the original if the transition probabilities between letters are also considered. Also one would want to experimentally validate the predicted differences in the designs.

8 Conclusions

MFDTool provides a means of optimizing the association of MFD hierarchical information with MFD buttons. Creating an effective association is difficult because of the large number of variables involved in the task. MFDTool quantifies the variables, thereby allowing standard optimization approaches to be applied to the problem.

MFDTool should rarely be used in isolation from the rest of the design process. Instead, it will probably be most beneficial as a collaborator with a designer. That is, a designer may create one hierarchical organization and hardware configuration and then run MFDTool to find the optimal layout of information. From that starting point, the designer can consider the effect of changing the hierarchical organization or hardware configuration, and re-running MFDTool for each change. The only fair comparison across different hierarchical or hardware configurations is relative to their optimal association. Such comparisons would have been nearly impossible in the past because the association itself was very difficult to optimize. MFDTool greatly simplifies this process, thereby allowing the designer to compare a larger set of possible designs.

Those skilled in the art will recognize that the various embodiments of the various devices and processes described herein are exemplary, and that many other such implementations may be derived based on the teachings herein without undue experimentation. For example, the buttons described herein could be varied in many different ways (e.g., differing buttons on one or more display pages could use different text fonts, be different colors, use different sized text, be different shapes, etc.). In addition, ways of manipulating the buttons could be other than those described herein (e.g., by joystick). Furthermore, those skilled in the art will recognize that many other optimization routines other than those described herein could be employed under the teachings herein without undue experimentation.

Other embodiments are within the following claims.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

What is claimed is:

1. A method comprising:
    accepting user input specifying a geometrical arrangement of two or more buttons on one or more displayed pages;
    accepting user input labeling at least two of the two or more buttons on the one or more displayed pages;
    accepting user input defining at least one interaction between the labeled at least two buttons;
    accepting user input specifying at least one constraint cost for the defined at least one interaction;
    calculating at least one constraint cost value corresponding, respectively, to the at least one constraint cost; and
    automatically assigning the labels of the at least two buttons among the two or more buttons on one or more displayed pages such that the at least one constraint cost is substantially optimized and the at least one constraint cost value is indicative of a relative optimization of the at least one constraint cost.

2. The method of claim 1, wherein said accepting user input specifying a geometrical arrangement of two or more buttons on one or more displayed pages further comprises:
    accepting user input specifying one or more sizes of the one or more displayed pages.

3. The method of claim 1, wherein said accepting user input specifying a geometrical arrangement of two or more buttons on one or more displayed pages further comprises:
    accepting user input specifying two or more locations of the two or more buttons on the one or more displayed pages.

4. The method of claim 1, wherein said accepting user input labeling at least two of the two or more buttons on the one or more displayed pages further comprises:
    accepting user input labeling at least two buttons on a first displayed page presented to a user.

5. The method of claim 1, wherein said accepting user input labeling at least two of the two or more buttons on the one or more displayed pages further comprises:

accepting user input labeling at least one button on a first displayed page presented to a user; and accepting user input labeling at least one button on a second displayed page presented to the user.

6. The method of claim 1, wherein said accepting user input defining at least one interaction between the labeled at least two buttons further comprises:

accepting user input identifying at least one relationship between the labeled at least two buttons, said relationship selected from a relationship group including a Fitts'-movement interaction, a Euclidean-distance interaction, a City-Block-distance interaction, an X-directed interaction, and a Y-directed interaction.

7. The method of claim 1, wherein said accepting user input specifying at least one constraint cost for the defined at least one interaction further comprises:

accepting user input specifying at least one constraint cost for the defined at least one interaction, said at least one constraint cost selected from a constraint-cost group including a global-difficulty cost, a pages-to-close-buttons cost, a pages-to-fixed buttons cost, a path-difficulty cost, a pages-to-far buttons cost, and a parent-to-child variability cost.

8. The method of claim 1, wherein said accepting user input specifying at least one constraint cost for the defined at least one interaction further comprises:

accepting user input specifying at least one weighting factor to be associated with the specified at least one constraint cost.

9. The method of claim 1, wherein said assigning the labels of the labeled at least two buttons among the two or more buttons on one or more displayed pages such that the at least one constraint cost is substantially optimized further comprises:

assigning at least one label of the labeled at least two buttons among the two or more buttons on the one or more displayed pages on the basis of an optimization procedure selected from an optimization-procedure group including a gradient descent substantial optimization procedure and a simulated annealing substantial optimization procedure.

10. A system comprising:

circuitry for accepting user input specifying a geometrical arrangement of two or more buttons on one or more displayed pages, said circuitry selected from an electrical-circuitry group including electrical circuitry having at least one discrete electrical circuit, electrical circuitry having at least one integrated circuit, electrical circuitry having at least one application specific integrated circuit, electrical circuitry forming a general purpose computing device configured by a computer program, electrical circuitry forming a memory device, and electrical circuitry forming a communications device;

circuitry for accepting user input labeling at least two of the two or more buttons on the one or more displayed pages, said circuitry selected from an electrical-circuitry group including electrical circuitry having at least one discrete electrical circuit, electrical circuitry having at least one integrated circuit, electrical circuitry having at least one application specific integrated circuit, electrical circuitry forming a general purpose computing device configured by a computer program, electrical circuitry forming a memory device, and electrical circuitry forming a communications device;

circuitry for accepting user input defining at least one interaction between the labeled at least two buttons, said circuitry selected from an electrical-circuitry group including electrical circuitry having at least one discrete electrical circuit, electrical circuitry having at least one integrated circuit, electrical circuitry having at least one application specific integrated circuit, electrical circuitry forming a general purpose computing device configured by a computer program, electrical circuitry forming a memory device, and electrical circuitry forming a communications device;

circuitry for accepting user input specifying at least one constraint cost for the defined at least one interaction, said circuitry selected from an electrical-circuitry group including electrical circuitry having at least one discrete electrical circuit, electrical circuitry having at least one integrated circuit, electrical circuitry having at least one application specific integrated circuit, electrical circuitry forming a general purpose computing device configured by a computer program, electrical circuitry forming a memory device, and electrical circuitry forming a communications device;

circuitry for calculating at least one constraint cost value corresponding, respectively, to the at least one constraint cost, said circuitry selected from an electrical-circuitry group including electrical circuitry having at least one discrete electrical circuit, electrical circuitry having at least one integrated circuit, electrical circuitry having at least one application specific integrated circuit, electrical circuitry forming a general purpose computing device configured by a computer program, electrical circuitry forming a memory device, and electrical circuitry forming a communications device; and circuitry for automatically assigning the labels of the at least two buttons among the two or more buttons on one or more displayed pages such that the at least one constraint cost is substantially optimized and the at least one constraint cost value is indicative of a relative optimization of the at least one constraint cost, said circuitry selected from an electrical-circuitry group including electrical circuitry having at least one discrete electrical circuit, electrical circuitry having at least one integrated circuit, electrical circuitry having at least one application specific integrated circuit, electrical circuitry forming a general purpose computing device configured by a computer program, electrical circuitry forming a memory device, and electrical circuitry forming a communications device.

11. The system of claim 10, wherein said circuitry for accepting user input specifying a geometrical arrangement of two or more buttons on one or more displayed pages further comprises:

circuitry for accepting user input specifying one or more sizes of the one or more displayed pages.

12. The system of claim 10, wherein said circuitry for accepting user input specifying a geometrical arrangement of two or more buttons on one or more displayed pages further comprises:

circuitry for accepting user input specifying two or more locations of the two or more buttons on the one or more displayed pages.

13. The system of claim 10, wherein said circuitry for accepting user input labeling at least two of the two or more buttons on the one or more displayed pages further comprises:

circuitry for accepting user input labeling at least two buttons on a first displayed page presented to a user.

14. The system of claim 10, wherein said circuitry for accepting user input labeling at least two of the two or more buttons on the one or more displayed pages further comprises:

circuitry for accepting user input labeling at least one button on a first displayed page presented to a user; and circuitry for accepting user input labeling at least one button on a second displayed page presented to the user.

15. The system of claim 10, wherein said circuitry for accepting user input defining at least one interaction between the labeled at least two buttons further comprises:

circuitry for accepting user input identifying at least one relationship between the labeled at least two buttons, said relationship selected from a relationship group including a Fitts'-movement interaction, a Euclidean-distance interaction, a City-Block-distance interaction, an X-directed interaction, and a Y-directed interaction.

16. The system of claim 10, wherein said circuitry for accepting user input specifying at least one constraint cost for the defined at least one interaction further comprises:

circuitry for accepting user input specifying at least one constraint cost for the defined at least one interaction, said at least one constraint cost selected from a constraint-cost group including a global-difficulty cost, a pages-to-close-buttons cost, a pages-to-fixed buttons cost, a path-difficulty cost, a pages-to-far buttons cost, and a parent-to-child variability cost.

17. The system of claim 10, wherein said circuitry for accepting user input specifying at least one constraint cost for the defined at least one interaction further comprises:

circuitry for accepting user input specifying at least one weighting factor to be associated with the specified at least one constraint cost.

18. The system of claim 10, wherein said circuitry for assigning the labels of the labeled at least two buttons among the two or more buttons on one or more displayed pages such that the at least one constraint cost is substantially optimized further comprises:

circuitry for assigning at least one label of the labeled at least two buttons among the two or more buttons on the one or more displayed pages on the basis of an optimization procedure selected from an optimization-procedure group including a gradient descent substantial optimization procedure and a simulated annealing substantial optimization procedure.

19. A system comprising:

means for accepting user input specifying a geometrical arrangement of two or more buttons on one or more displayed pages;

means for accepting user input labeling at least two of the two or more buttons on the one or more displayed pages;

means for accepting user input defining at least one interaction between the labeled at least two buttons;

means for accepting user input specifying at least one constraint cost for the defined at least one interaction;

means for calculating at least one constraint cost value corresponding, respectively, to the at least one constraint cost and means for automatically assigning the labels of the at least two buttons among the two or more buttons on one or more displayed pages such that the at least one constraint cost is substantially optimized and the at least one constraint cost value is indicative of a relative optimization of the at least one constraint cost.

20. The system of claim 19, wherein said means for accepting user input specifying a geometrical arrangement of two or more buttons on one or more displayed pages further comprises:

means for accepting user input specifying one or more sizes of the one or more displayed pages.

21. The system of claim 19, wherein said means for accepting user input specifying a geometrical arrangement of two or more buttons on one or more displayed pages further comprises:

means for accepting user input specifying two or more locations of the two or more buttons on the one or more displayed pages.

22. The system of claim 19, wherein said means for accepting user input labeling at least two of the two or more buttons on the one or more displayed pages further comprises:

means for accepting user input labeling at least two buttons on a first displayed page presented to a user.

23. The system of claim 19, wherein said means for accepting user input labeling at least two of the two or more buttons on the one or more displayed pages further comprises:

means for accepting user input labeling at least one button on a first displayed page presented to a user; and means for accepting user input labeling at least one button on a second displayed page presented to the user.

24. The system of claim 19, wherein said means for accepting user input defining at least one interaction between the labeled at least two buttons further comprises:

means for accepting user input identifying at least one relationship between the labeled at least two buttons, said relationship selected from a relationship group including a Fitts'-movement interaction, a Euclidean-distance interaction, a City-Block-distance interaction, an X-directed interaction, and a Y-directed interaction.

25. The system of claim 19, wherein said means for accepting user input specifying at least one constraint cost for the defined at least one interaction further comprises:

means for accepting user input specifying at least one constraint cost for the defined at least one interaction, said at least one constraint cost selected from a constraint-cost group including a global-difficulty cost, a pages-to-close-buttons cost, a pages-to-fixed buttons cost, a path-difficulty cost, a pages-to-far buttons cost, and a parent-to-child variability cost.

26. The system of claim 19, wherein said means for accepting user input specifying at least one constraint cost for the defined at least one interaction further comprises:

means for accepting user input specifying at least one weighting factor to be associated with the specified at least one constraint cost.

27. The system of claim 19, wherein said means for assigning the labels of the labeled at least two buttons among the two or more buttons on one or more displayed pages such that the at least one constraint cost is substantially optimized further comprises:

means for assigning at least one label of the labeled at least two buttons among the two or more buttons on the one or more displayed pages on the basis of an optimization procedure selected from an optimization-procedure group including a gradient descent substantial optimization procedure and a simulated annealing substantial optimization procedure.

28. A computer program product comprising a computer useable medium including a computer readable program, wherein the computer readable program when executed on a computer causes the computer to:

accept user input specifying a geometrical arrangement of two or more buttons on one or more displayed pages;

accept user input labeling at least two of the two or more buttons on the one or more displayed pages;

accept user input defining at least one interaction between the labeled at least two buttons;

accept user input specifying at least one constraint cost for the defined at least one interaction;
calculate at least one constraint cost value corresponding, respectively, to the at least one constraint cost; and
automatically assign the labels of the at least two buttons among the two or more buttons on one or more displayed pages such that the at least one constraint cost is substantially optimized and the at least one constraint cost value is indicative of a relative optimization of the at least one constraint cost.

* * * * *